(12) United States Patent
Hinoue et al.

(10) Patent No.: US 8,257,845 B2
(45) Date of Patent: *Sep. 4, 2012

(54) MAGNETIC RECORDING MEDIUM UTILIZING A RECORDING LAYER HAVING MORE AND LESS CONCENTRATED PARTS OF A NONMAGNETIC ELEMENT IN AN IN-PLANE DIRECTION AND A NONMAGNETIC LAYER

(75) Inventors: Tatsuya Hinoue, Kanagawa (JP); Hiroshi Kanai, Kanagawa-ken (JP); Toshinori Ono, Tokyo (JP); Hiroyuki Suzuki, Kanagawa (JP); Hiroshi Inaba, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 339 days.

This patent is subject to a terminal disclaimer.

(21) Appl. No.: 12/378,120

(22) Filed: Feb. 10, 2009

(65) Prior Publication Data

US 2009/0214898 A1    Aug. 27, 2009

(30) Foreign Application Priority Data

Feb. 22, 2008    (JP) ................................ 2008-041615

(51) Int. Cl.
*G11B 5/66* (2006.01)
(52) U.S. Cl. ..................... 428/828.1; 428/829; 428/832
(58) Field of Classification Search .................. None
See application file for complete search history.

(56) References Cited

U.S. PATENT DOCUMENTS

| | | | |
|---|---|---|---|
| 6,055,139 A | 4/2000 | Ohtsuka et al. | |
| 6,665,145 B2 | 12/2003 | Wada | |
| 7,311,983 B2 * | 12/2007 | Watanabe et al. | 428/829 |
| 7,405,011 B2 | 7/2008 | Stipe et al. | |
| 7,471,484 B2 | 12/2008 | Wachenschwanz et al. | |
| 7,608,193 B2 | 10/2009 | Wachenschwanz et al. | |
| 7,615,292 B2 | 11/2009 | Ito et al. | |
| 7,670,696 B2 | 3/2010 | Fullerton et al. | |
| 2006/0222898 A1 * | 10/2006 | Ichihara | 428/826 |
| 2007/0218318 A1 | 9/2007 | Watanabe | |
| 2007/0224455 A1 * | 9/2007 | Iida et al. | 428/831.2 |
| 2008/0075845 A1 * | 3/2008 | Sonobe et al. | 427/130 |
| 2008/0292907 A1 * | 11/2008 | Berger et al. | 428/828 |

(Continued)

FOREIGN PATENT DOCUMENTS

JP    05205257    8/1993

(Continued)

OTHER PUBLICATIONS

Machine Translation of JP 2006-309841 A (Patent Published Nov. 2006).*

(Continued)

*Primary Examiner* — Kevin Bernatz

(57) ABSTRACT

Embodiments of the present invention help to produce discrete track media and bit patterned media having both excellent recording and reproducing performance and reliability. According to one embodiment, a manufacturing method forms a nonmagnetic layer mainly composed of the same element as a nonmagnetic element contained in magnetic recording layers and on the magnetic recording layers and a mask layer having apertures for forming more concentrated parts of the nonmagnetic element in the magnetic recording layers on the nonmagnetic layer. The method implants ions of the nonmagnetic element through the nonmagnetic layer masked by the mask layer to form the more concentrated parts of the nonmagnetic element in the magnetic recording layer.

19 Claims, 40 Drawing Sheets

U.S. PATENT DOCUMENTS

| | | | |
|---|---|---|---|
| 2009/0123660 A1* | 5/2009 | Inaba et al. | 427/535 |
| 2009/0202865 A1* | 8/2009 | Kimura et al. | 428/828 |
| 2009/0213497 A1* | 8/2009 | Ono et al. | 360/135 |
| 2009/0214895 A1* | 8/2009 | Hinoue et al. | 428/827 |
| 2010/0084374 A1* | 4/2010 | Kimura et al. | 216/22 |

FOREIGN PATENT DOCUMENTS

| | | |
|---|---|---|
| JP | 8096340 A | 4/1996 |
| JP | 9167336 | 6/1997 |
| JP | 3034879 | 2/2000 |
| JP | 2000268340 A | 9/2000 |
| JP | 2002288813 A | 10/2002 |
| JP | 2004005915 A | 1/2004 |
| JP | 20006019000 A | 1/2006 |
| JP | 2006-309841 | 11/2006 |
| JP | 2007220164 | 8/2007 |
| JP | 2007226862 | 9/2009 |
| WO | 2009041286 | 4/2009 |

OTHER PUBLICATIONS

Derwent Abstract Translation of US 2009/0202865 A1 (Derwent Acc-No: 2009-G63934) (Apr. 2009).*

Machine Translation of JP 05-205257 A (patent published 1993).*

* cited by examiner

MAGNETIC RECORDING MEDIUM UTILIZING A RECORDING LAYER HAVING MORE AND LESS CONCENTRATED PARTS OF A NONMAGNETIC ELEMENT IN AN IN-PLANE DIRECTION AND A NONMAGNETIC LAYER

CROSS-REFERENCE TO RELATED APPLICATION

The instant nonprovisional patent application claims priority to Japanese Patent Application No. 2008-041615 filed Feb. 22, 2008 and which is incorporated by reference in its entirety herein for all purposes.

BACKGROUND OF THE INVENTION

In recent years, magnetic recording and reproducing devices have been requested to attain more capacity and achieve higher performance due to increasing amount of information for personal computers and expanding applications to image recording apparatus, car navigation apparatus, and the like. For higher recording density, a smaller unit of magnetization reversal in magnetic recording media and media noise reduction are required. Conventional magnetic recording media have adopted a configuration that the ferromagnetic crystal grains constituting magnetic recording layers are preliminarily separated by nonmagnetic materials contained in magnetic recording layers.

To increase the magnetic recording density by active control of the separators, discrete track media in which recording tracks are separated, and further, bit patterned media in which recording bits are separated, have been researched and developed. The technique to form the separators has been a significant point for higher recording density in both of these media. For example, the following techniques have been proposed to form the separators in discrete track media. One technique is the substrate processing type which preliminarily forms concentric lands and grooves on a substrate and forms a magnetic film thereon to form a patterned magnetic film. Another technique is the magnetic film processing type which masks a magnetic film and etches the parts of a magnetic film to be grooves to form the pattern.

These techniques, however, include a plurality of processes such as backfilling nonmagnetic materials into the grooves, planarizing the surface so as to have the same level as the magnetic film to be the islands, and forming a protection film on the planarized surface. Consequently, other problems arise such as increase in foreign substances produced on the surfaces of the magnetic film and the protection film and increase in roughness of the surfaces. They prevent the reduction in the spacing between a magnetic head and a magnetic disk (nanospacing), which is another point for higher recording density.

To overcome these problems, a method of forming separators by ion implantation has been attempted. For example, Japanese Patent No. 3034879 ("Patent Document 1") discloses a method of forming separators between recording tracks of a discrete track medium by demagnetizing a magnetic layer by means of implanting nitrogen ions or the like. According to Patent Document 1, this method may increase the track density and improve the recording density.

Japanese Patent Application Publication No. 2006-309841 ("Patent Document 2") discloses a method of forming separators by ion implanting an element such as Cr through an ion buffer layer made of carbon or the like formed on a magnetic film and heat treating to reduce the coercivity of the ion implanted area. According to Patent Document 2, the method may control the ion concentration in the direction of the magnetic layer thickness to concentrate a ferromagnetic area on a specific area.

Methods for separating recording tracks in discrete track media or recording bits in bit patterned media are important issues.

In the methods of the above-listed documents, to improve the track density while preventing side writings onto recording tracks by changing the magnetism of the separators, a huge amount of ions are required to be implanted. In that case, a part of the ions may diffuse over the recording tracks to change the magnetic property of the recording tracks so that the recording and reproducing performance may disadvantageously deteriorated, for example, the power output may be significantly reduced. Also, when an ion buffer layer is used, if the element composing the ion buffer layer is different from the element of the implanted ions, the corrosion resistance may be deteriorated because of the difference in the ionization tendencies between the elements.

BRIEF SUMMARY OF THE INVENTION

Embodiments of the present invention help to produce discrete track media and bit patterned media having both excellent recording and reproducing performance and reliability. In the particular embodiment of FIG. 6, a manufacturing method forms a nonmagnetic layer 20 mainly composed of the same element as a nonmagnetic element contained in magnetic recording layers 18 and 19 on the magnetic recording layers and a mask layer 21' having apertures for forming more concentrated parts of the nonmagnetic element in the magnetic recording layers on the nonmagnetic layer 20. The method implants ions of the nonmagnetic element 23 through the nonmagnetic layer 20 masked by the mask layer 21' to form the more concentrated parts 24 of the nonmagnetic element in the magnetic recording layer.

DETAILED DESCRIPTION OF THE INVENTION

Figure 1:
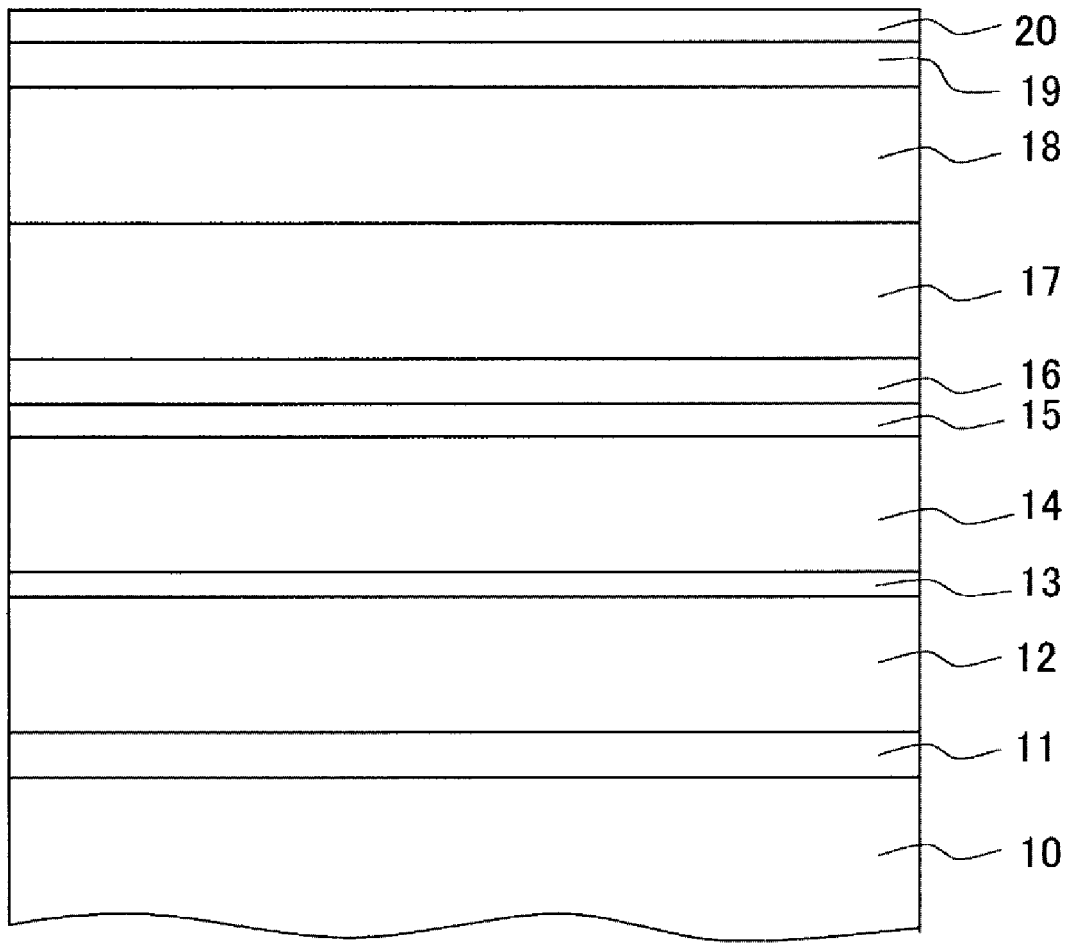
FIG. 1 is a drawing showing a manufacturing step of a magnetic recording medium according to Example 1.

Embodiments of the present invention relate to patterned media suitable for high recording density represented by discrete track media and bit patterned media, and a manufacturing method thereof, and more particularly, relate to track guide separators.

Embodiments of the present invention provide discrete track media or bit patterned media with good recording and reproducing performance and high reliability. In particular, in forming separators of the discrete track media or bit patterned media by ion implantation, it is aimed to control the ions to be implanted so as not to damage the recording tracks or recording bits.

A magnetic recording medium of embodiments of the present invention comprises a magnetic recording layer formed directly or indirectly on a substrate, a nonmagnetic element contained in the magnetic recording layer, more concentrated parts and less concentrated parts of the nonmagnetic element in the in-plane direction of the magnetic recording layer, and a nonmagnetic layer mainly composed of the element which is the same as the nonmagnetic element on the magnetic recording layer.

As a method of providing more concentrated parts and less concentrated part of the nonmagnetic element in the magnetic recording layer in the in-plane direction, it is recommended to form a nonmagnetic layer mainly composed of the same, element as the nonmagnetic element contained in the magnetic recording layer on the magnetic recording layer, form a mask layer having apertures for forming the more concentrated parts of the nonmagnetic element in the magnetic recording layer, and ion-implant the nonmagnetic element in the magnetic layer with through the nonmagnetic layer using the mask layer as a mask.

As a method of providing more concentrated parts and less concentrated parts of the nonmagnetic element in the magnetic recording layer in the in-plane direction, a method of forming more concentrated parts and less concentrated parts of the nonmagnetic element in the magnetic recording layer may be used that form a mask layer having apertures for forming the more concentrated parts of the nonmagnetic element in the magnetic recording layer on the magnetic recording layer, form a nonmagnetic layer mainly composed of the same element as the nonmagnetic element on the mask layer and on the magnetic recording layer on the bottom of the apertures of the mask layer, and ion-implant the nonmagnetic element through the nonmagnetic layer using the mask layer as a mask.

If the magnetic recording layer comprises a plurality of magnetic layers, the nonmagnetic layer may be formed between at least two magnetic layers instead of on the magnetic recording layer. In this case, it is recommended to use a method of forming more concentrated pats of the nonmagnetic element in the magnetic recording layer by forming a mask layer having apertures to form more concentrated parts of the nonmagnetic element of the magnetic layers on the nonmagnetic layer, and ion-implanting the nonmagnetic element using the mask layer as a mask.

A discrete track medium may be produced by forming the more concentrated parts and less concentrated parts of the nonmagnetic element in the magnetic recording layer substantially concentrically. A bit patterned medium may be produced by forming the less concentrated parts of the nonmagnetic element in the magnetic recording layer like dots arranged substantially concentrically.

The nonmagnetic element may be any element selected from the group consisting of Cr, Mo, W, V, Nb, Ta, Ti, Zr, Hf, Ru, B, C, Si, and Ge. The nonmagnetic layer may have a thickness of 2 nm or less. If the nonmagnetic layer is formed on the magnetic recording layer, the main component of the nonmagnetic layer may be any element selected from the group consisting of Cr, Ta, and C.

If the magnetic recording layer comprises a plurality of magnetic layers and the nonmagnetic layer is formed between at least two magnetic layers constituting the magnetic recording layer instead of on the magnetic recording layer, the main component of the nonmagnetic layer may be any element selected from the group consisting of Ru, Ti, Cr, Mo, and W.

If the nonmagnetic layer is formed on the magnetic recording layer, the nonmagnetic layer may be removed before, after, or simultaneously with removing the mask layer.

According to embodiments of the present invention, discrete track media or bit patterned media with good recording and reproducing performance and high reliability may be produced.

Hereinafter, particular embodiments of the present invention will be described with reference to the drawings.

EXAMPLE 1

Referring to FIGS. 1 to 8, an example of a magnetic recording medium according to Example 1 of the present invention and a manufacturing method thereof are presented. In the present example, discrete track media were produced and their magnetic write width Mww was evaluated.

Explanation will be given while referring to FIG. 1. A substrate whose surface made of borosilicate glass or aluminosilicate glass was chemically strengthened was used as a substrate 10 after cleaning and drying. Instead of the chemically strengthened glass substrate, a substrate made by Ni—P coating an aluminum alloy substrate and then surface polishing or a rigid substrate made of Si- or Ti-alloy may be used.

On the substrate processed in the above step, a 5 nm of 50 at. % Al—50 at. % Ti alloy layer as a glue layer 11, a 15 nm of 51 at. % Fe—34 at. % Co—10 at. % Ta—5 at. % Zr alloy layer as a first soft-magnetic layer 12, a 0.5 nm of Ru layer as an antiferromagnetic coupling layer 13, a 15 nm of 51 at. % Fe—34 at. % Co—10 at. % Ta—5 at. % Zr alloy layer as a second soft magnetic layer 14, a 2 nm of 50 at. % Cr—50 at. % Ti alloy layer as an under layer 15, a 7 nm of 94 at. % Ni—6 at. % W alloy layer as a first orientation control layer 16, a 17 nm of Ru layer as a second orientation control layer 17, a 13 nm of 59 mol % Co—16 mol % Cr—17 mol % Pt—8 mol % SiO2 alloy layer as a first magnetic layer 18, a 6 nm of 63 at. % Co—15 at. % Cr—14 at. % Pt—8 at. % B alloy layer as a second magnetic layer 19, a 2 nm of Cr layer as a nonmagnetic layer 20 were stacked in this order (FIG. 1).

In depositing the layers, the substrate was transferred in vacuum and a single wafer type of sputtering apparatus capable of successive deposition of multiple layers in the above-described manner was used. Target alloys with the same compositions as the desired film compositions were prepared and sputtered to form the above described alloy layers. The Ar gas pressure in the deposition was 1 Pa when depositing the layers except for the second orientation control layer 17 and the first magnetic layer 18. The Ar gas pressures in the deposition of the second orientation control layer 17 were 1 Pa for the lower 9 nm of the second orientation control layer 17 and 5 Pa for the upper 8 nm thereof. In depositing the first magnetic layer 18, oxygen was added to Ar. The partial pressures of Ar and oxygen were 4 Pa and 0.2 Pa, respectively.

Figure 2:
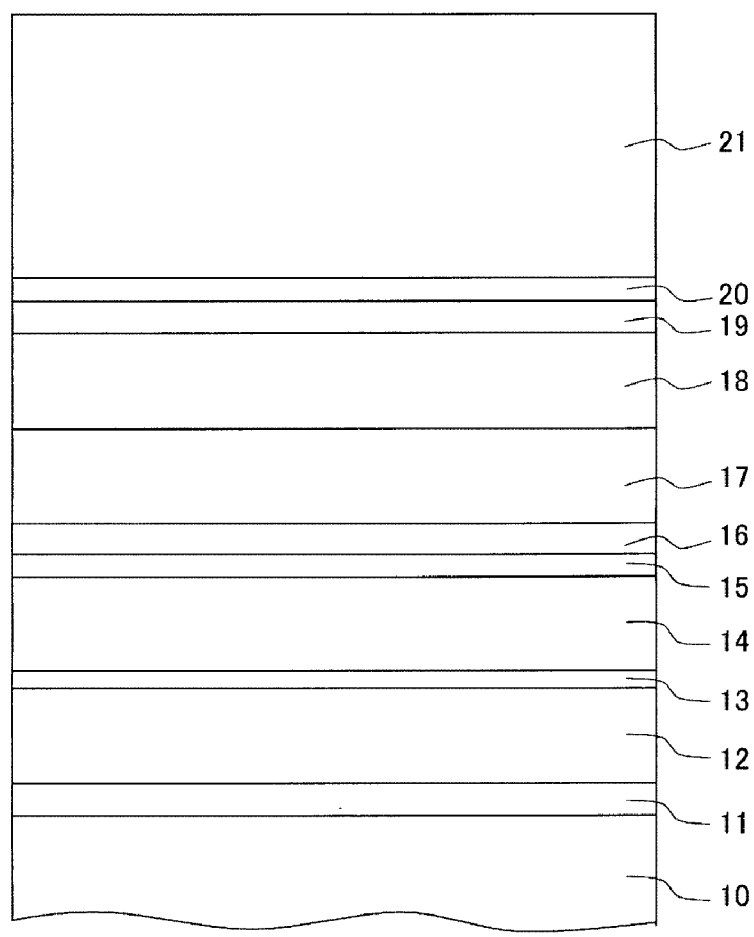
FIG. 2 is a drawing showing a manufacturing step of a magnetic recording medium according to Example 1.
Figure 3:
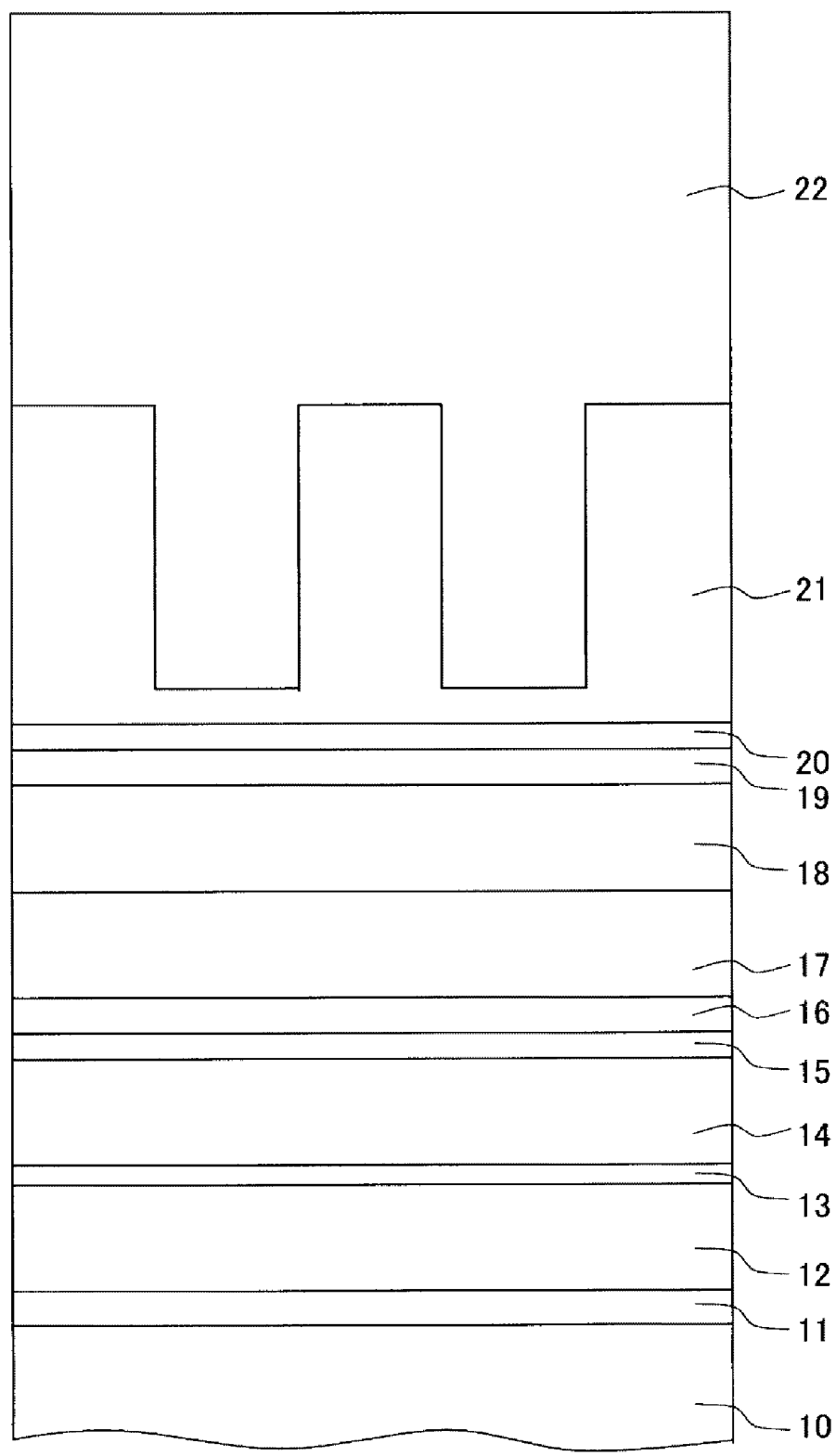
FIG. 3 is a drawing showing a manufacturing step of a magnetic recording medium according to Example 1.
Figure 4:
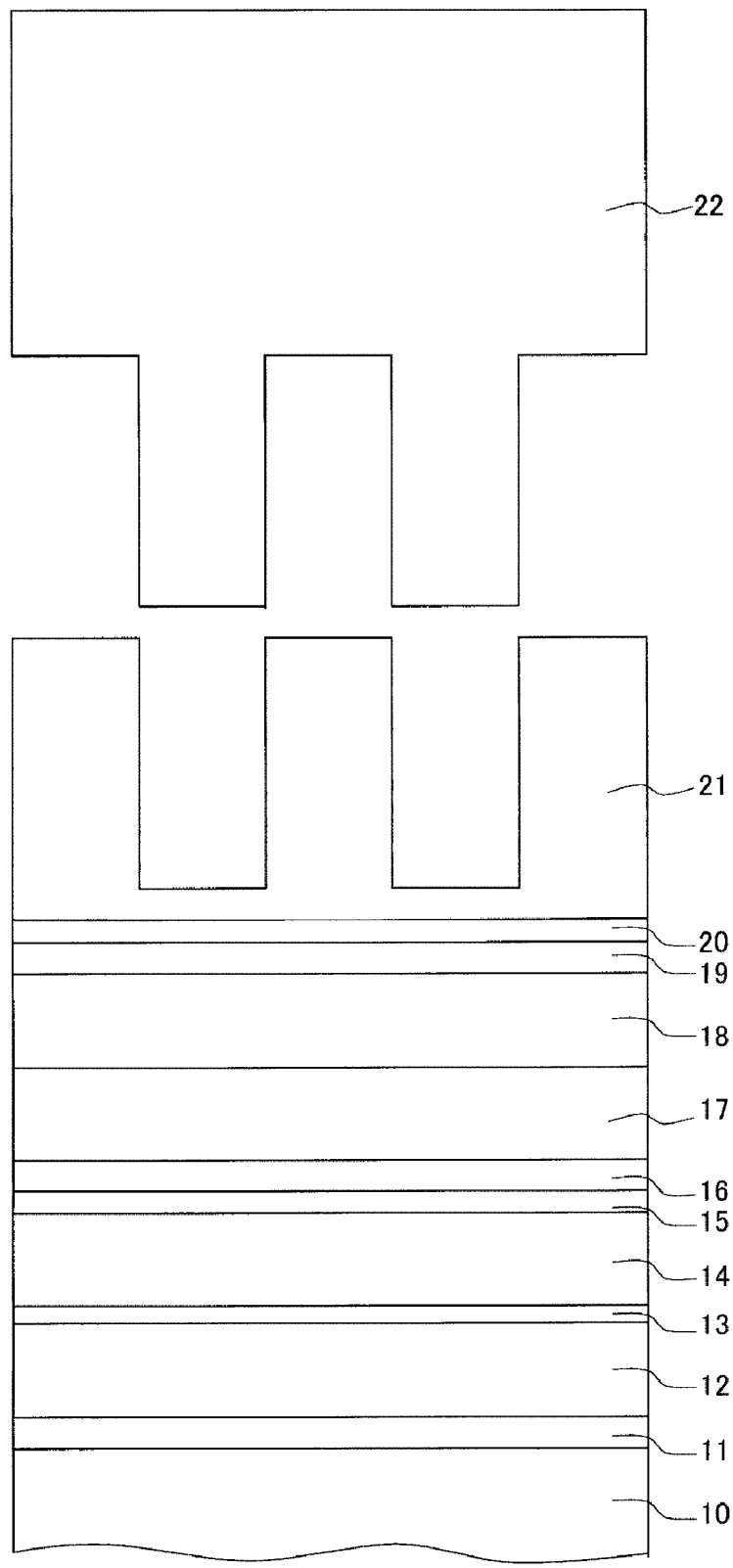
FIG. 4 is a drawing showing a manufacturing step of a magnetic recording medium according to Example 1.
Figure 5:
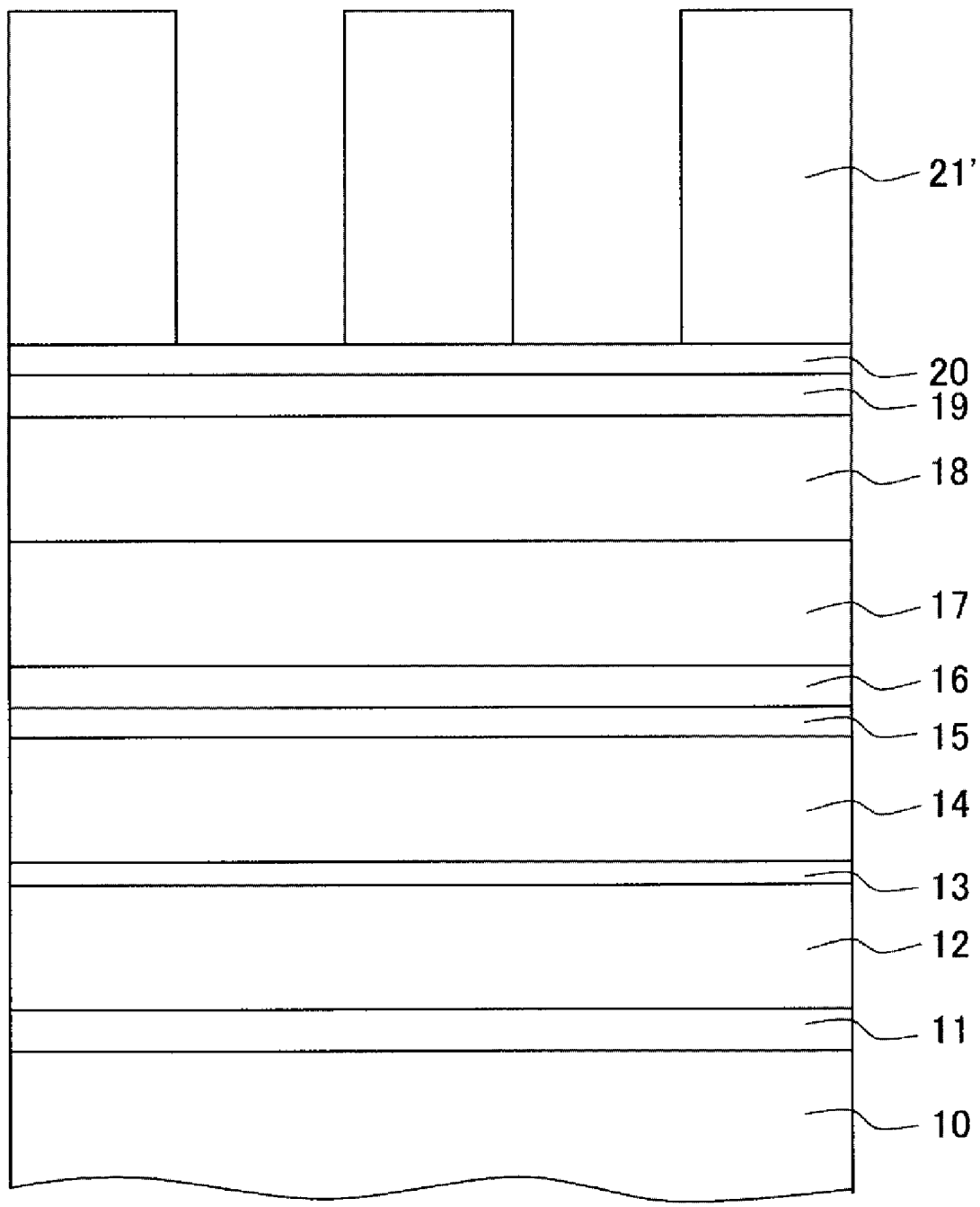
FIG. 5 is a drawing showing a manufacturing step of a magnetic recording medium according to Example 1.

After a resist 21 was applied to the medium processed in the above step, a stamper 22 with patterns of the same shape as the recording tracks and the servo areas was pressed against the resist 21 so that the patterns were copied onto the resist 21 (FIGS. 2 to 4). The residual resist film on the grooves of the resist 21 after copying the pattern was removed by reactive ion etching (RIE) using oxygen to form a resist pattern 21' having the track pitch of 120 nm, the track width of 60 nm, and the track height of 150 nm (FIG. 5). This resist pattern includes patterns of servo areas simultaneously formed by stamping.

Figure 6:
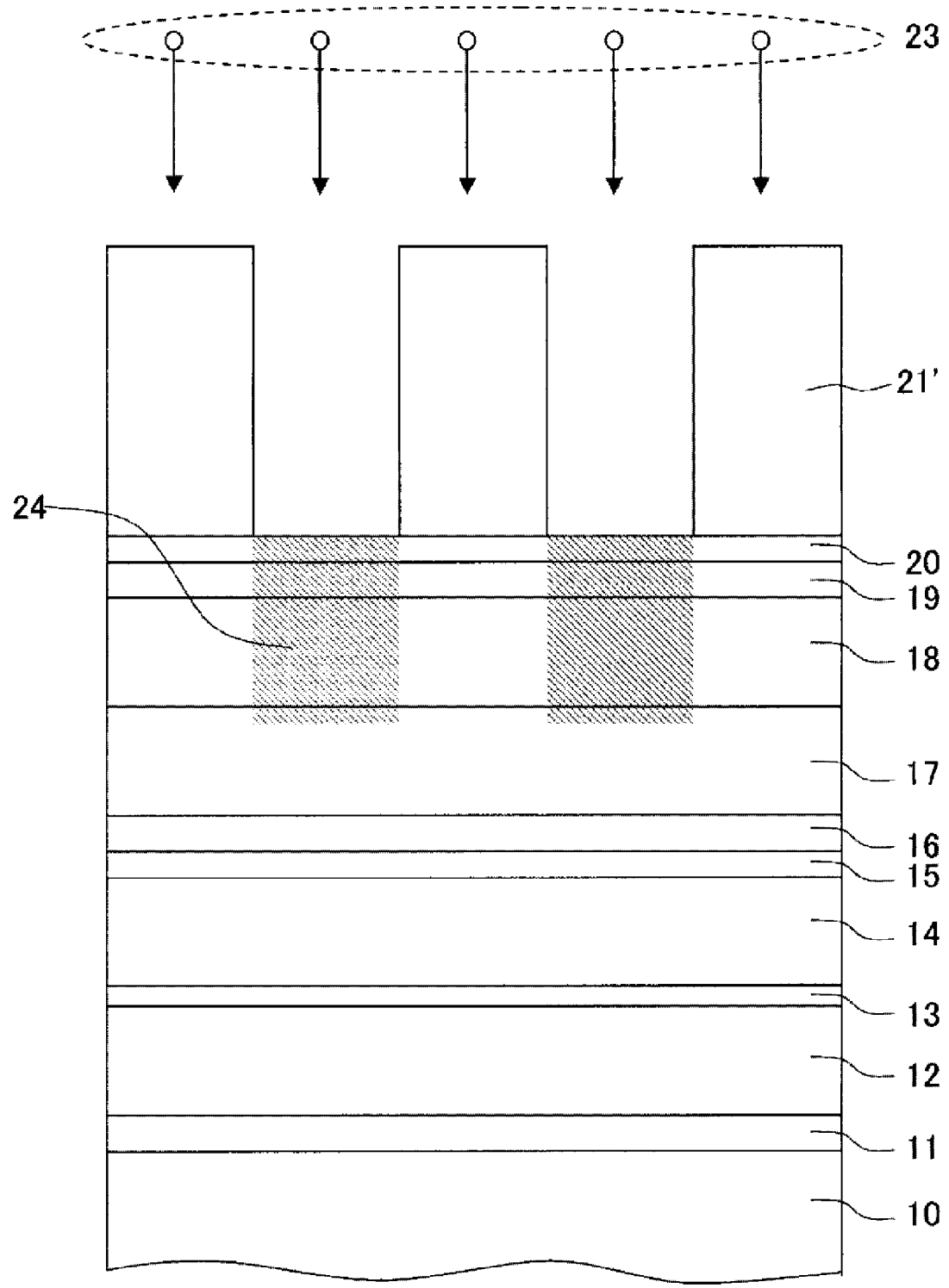
FIG. 6 is a drawing showing a manufacturing step of a magnetic recording medium according to Example 1.
Figure 7:
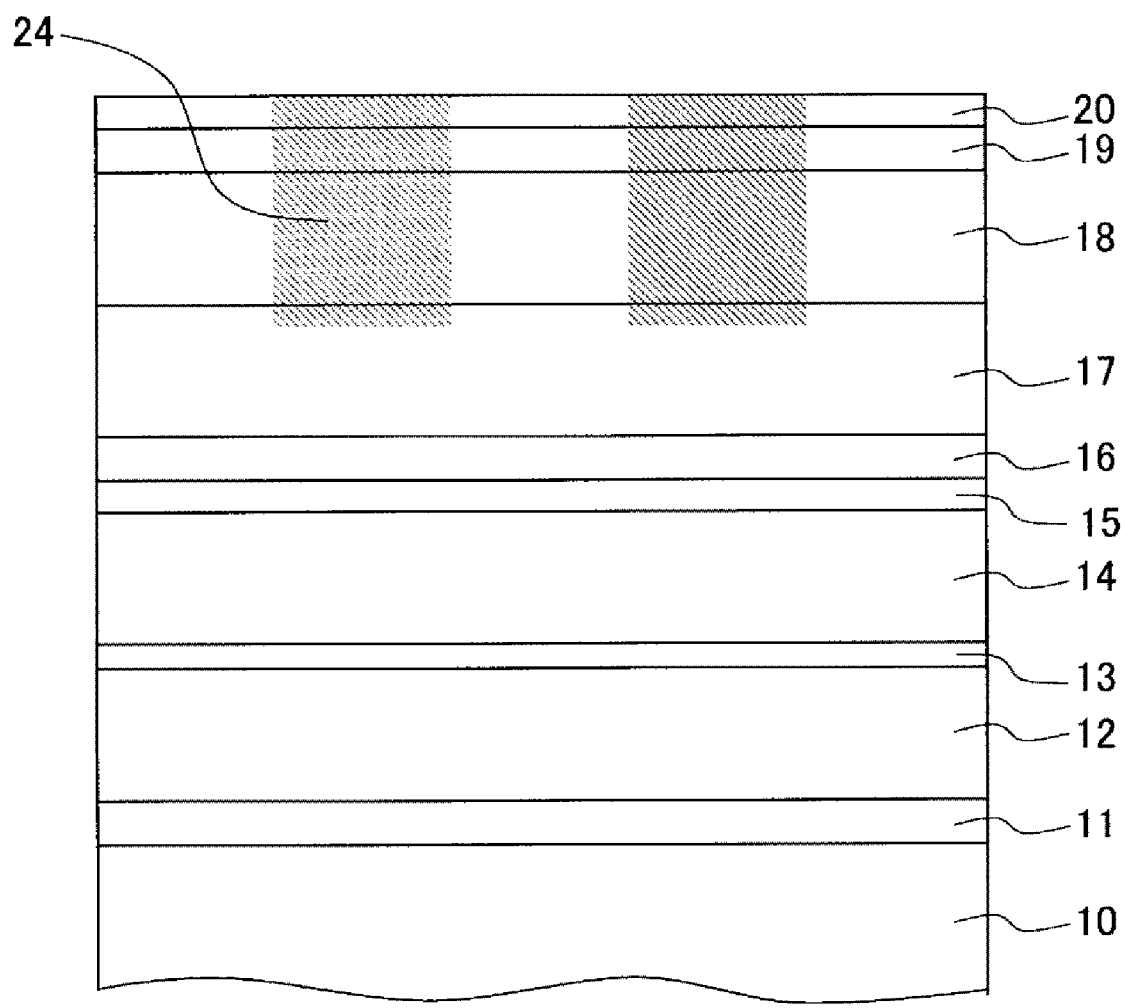
FIG. 7 is a drawing showing a manufacturing step of a magnetic recording medium according to Example 1.

After forming the resist pattern, Cr ions as nonmagnetic element ions 23 were radiated to the medium to form more concentrated parts of the nonmagnetic element Cr as track separators 24 on some parts of the first magnetic layer 18 and the second magnetic layer 19 (FIG. 6).

To radiate ions to the medium, a method was used that generates plasma mainly composed of the nonmagnetic element (Cr in the present example) to be radiated by arc discharge at the cathode, transfers the generated plasma via a curved magnetic field duct, and radiates plasma beam to the medium. Alternately, to radiate nonmagnetic element ions to the medium, an ion beam source may be used. Cr ions were radiated at the acceleration voltage of 28 kV, in the radiation amount of $1\times10^{15}$ to $4\times10^{16}/cm^2$.

Figure 8:
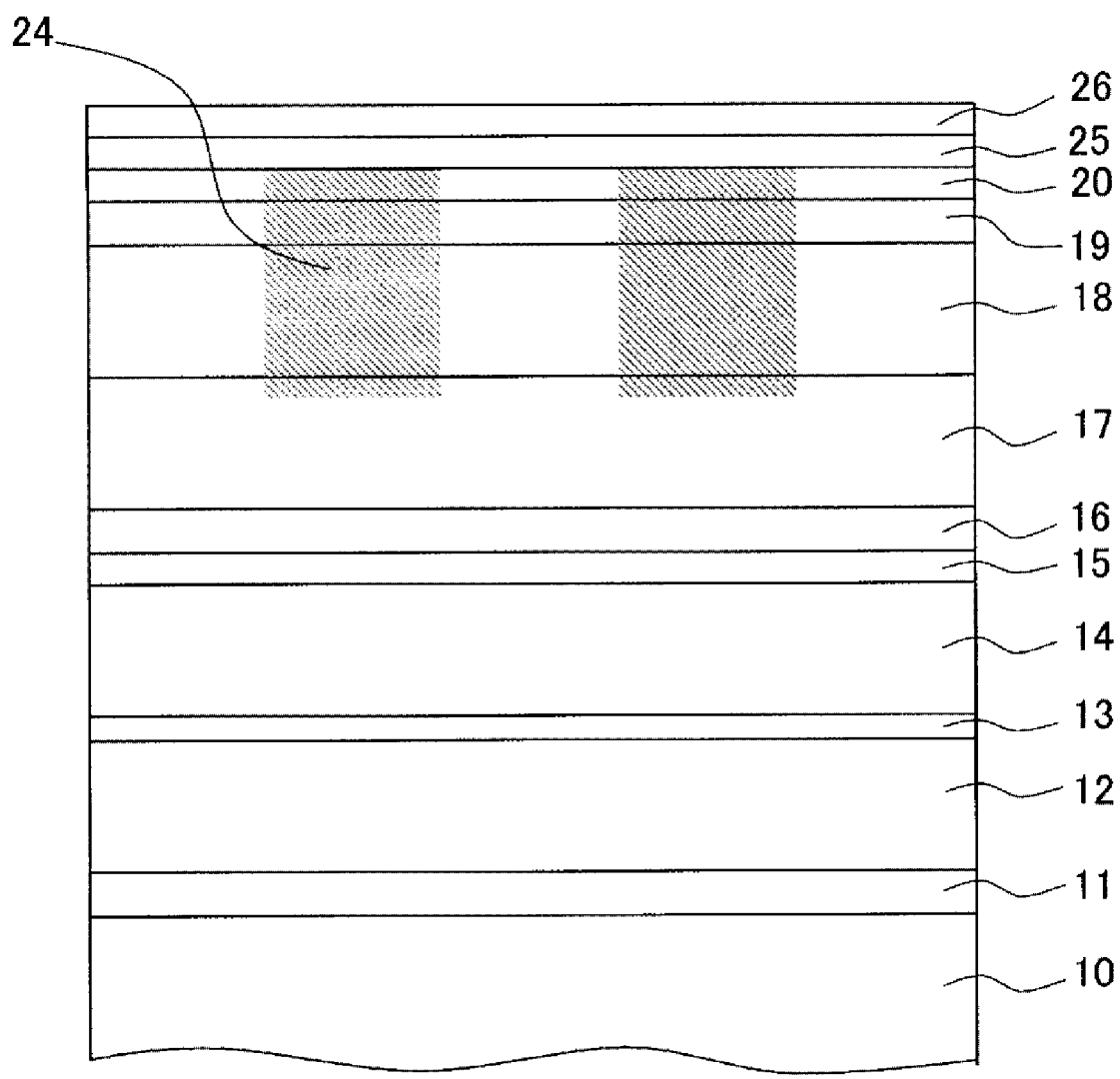
FIG. 8 is a drawing showing a manufacturing step of a magnetic recording medium according to Example 1.

After the Cr ion radiation, the resist pattern 21' was removed by the RIE using oxygen (FIG. 7), a diamond-like carbon (DLC) protection film 25 of 2 nm in thickness was deposited by the CVD, and a perfluoro-alkyl polyether based lubricant was applied to form a lubrication film 26 of 1 nm in thickness (FIG. 8). Instead of the DLC protection film, a carbon protection film made by sputtering, a tetrahedral amorphous carbon (ta-C) protection film which was formed by the cathodic arc method with an ion transfer mechanism using a magnetic field filter, or the like may be used. In deposition of the DLC protection film, a mixed gas of $C_2H_2$ and $N_2O$ was used as deposition gas.

The Mww of the produced media was evaluated using a spin-stand. A magnetic head with a track width of reader (Twr) of 50 nm and a track width of writer (Tww) of 70 nm was used.

Figure 32:
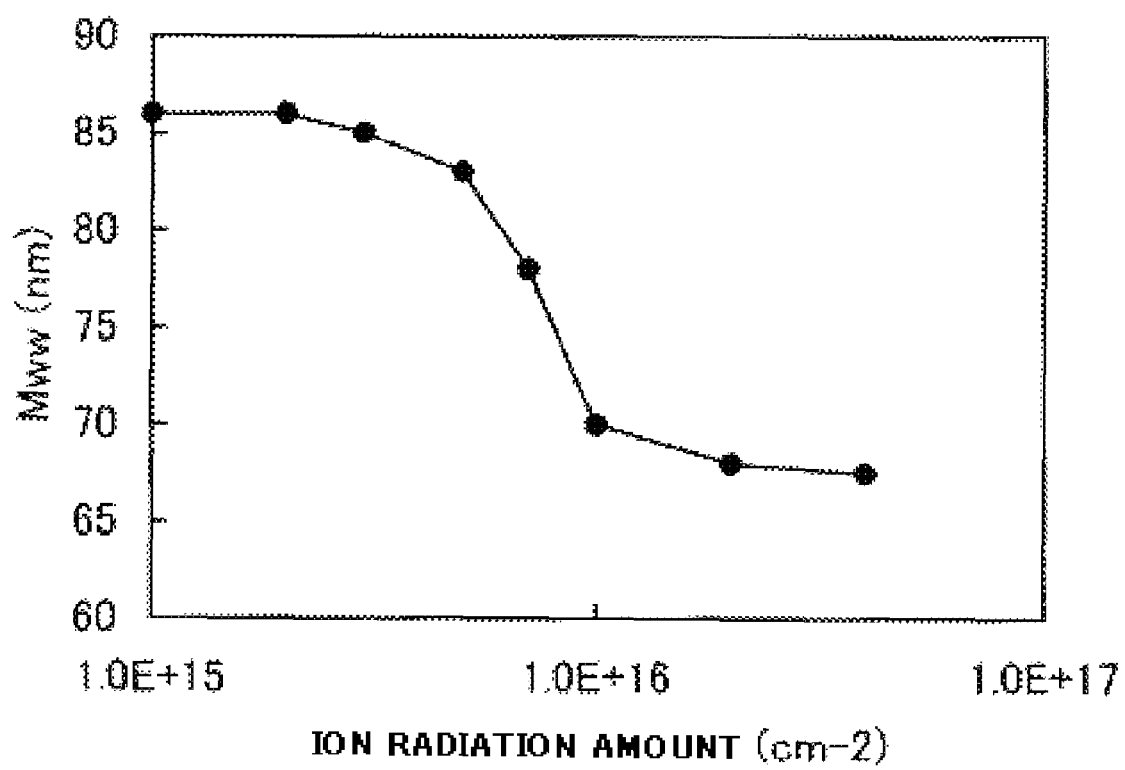
FIG. 32 is a drawing showing evaluation results of magnetic recording width Mww.

The results are shown in FIG. 32. The Mww was almost stable where the radiation amount was as small as $3\times10^{15}/cm^2$ or less, and then as the radiation amount increased, the Mww gradually decreased, and when the radiation amount became $1\times10^{16}/cm^2$ or more, the Mww became almost stable. Compared with that the Mww was not less than 85 nm at the least Cr radiation amount, the Mww was drastically decreased to about 70 nm in the area where the radiation amount was $1\times10^{16}/cm^2$ or more. Thus, it was recognized that the narrowing the track width was able to improve track density drastically.

The above-described variation in Mww may be explained as follows. The area where the radiation amount is as small as $3\times10^{15}/cm^2$ or less and the Mww is almost stable is an area where the increase in concentration of the nonmagnetic atoms in the track separators 24 is small so that the magnetic property does not change enough to separate the tracks. The area where the Mww then decreases with increase in the radiation amount is an area where the concentration of the nonmagnetic atoms in the track separators 24 increases with the radiation amount and the magnetization in the track separators 24 is gradually reduced, so that the magnetic coupling between tracks are weakened and the Mww gradually decreases. The area where the Mww becomes almost stable in the radiation amount of $1\times10^{16}/cm^2$ or more is an area where the concentration of the nonmagnetic atoms increases until the magnetization of the track separators 24 become small enough to separate the tracks.

Figure 33:
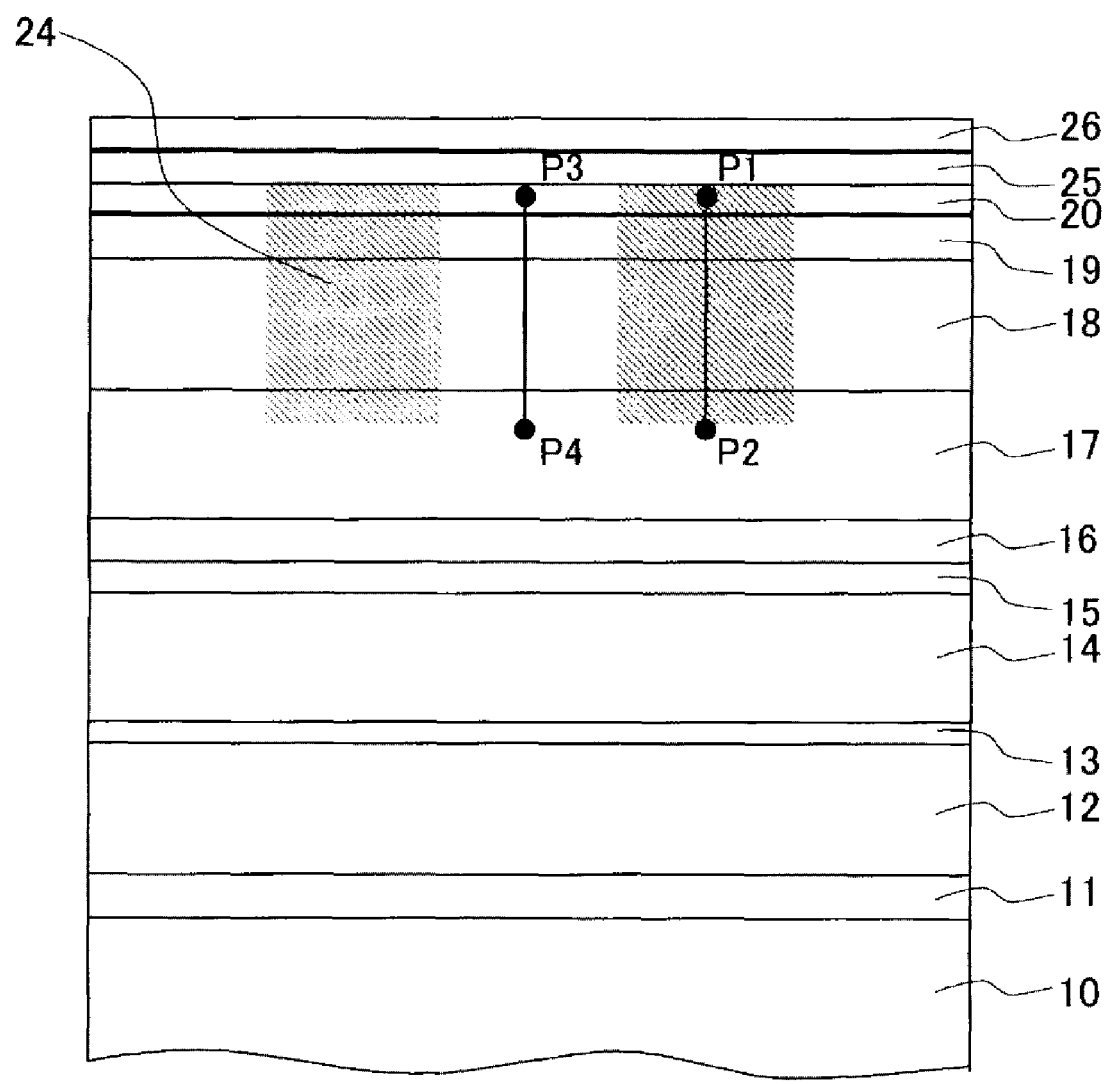
FIG. 33 is a schematic showing analysis positions where element analysis of a medium was conducted.

With respect to samples with Cr ions radiated in the amount of $2\times10^{16}/cm^2$ in the present embodiment, the Cr concentrations in the track separators 24 and in the recording tracks were analyzed. An energy dispersive X-ray spectrometer (EDX) was used in the analysis. The analysis of the track separators was conducted around the middle of the track separator in the in-plane direction, from the vicinity of the middle of the nonmagnetic layer 20 (P1 in FIG. 33) to the vicinity of the top of the second orientation control layer 17 (P2 in FIG. 33) in the direction perpendicular to the plane. Similarly, the analysis of the recording tracks was conducted around the middle of the recording track in the in-plane direction, from the vicinity of the middle of the nonmagnetic layer 20 (P3 in FIG. 33) to the vicinity of the top of the second orientation control layer 17 (P4 in FIG. 33) in the direction perpendicular to the plane.

Figure 34:
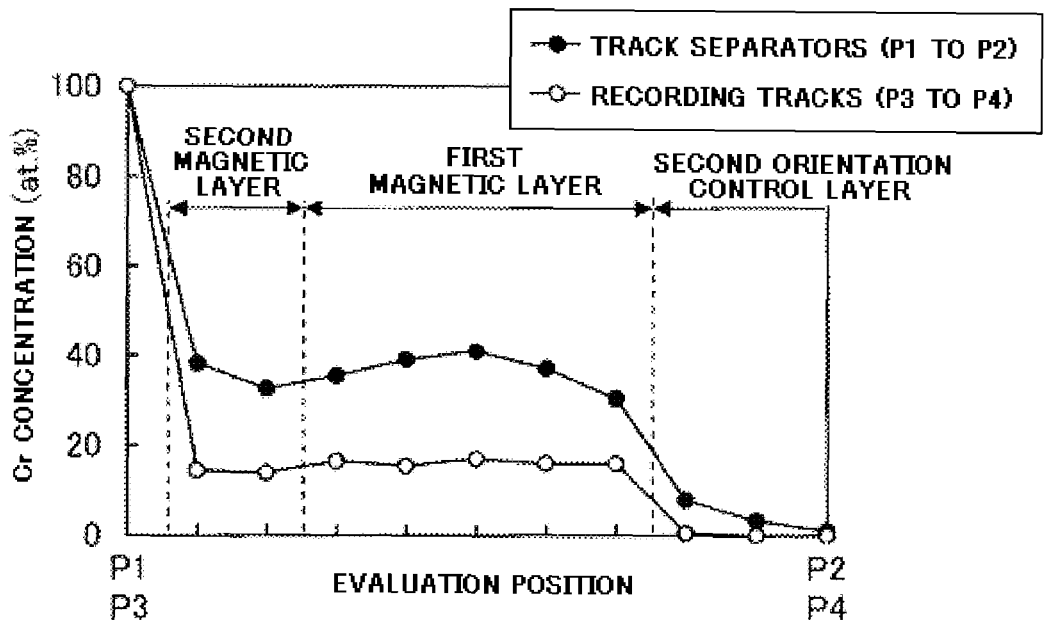
FIG. 34 is a schematic showing element analysis of a medium.

The results are shown in FIG. 34. As to the track separators 24, the Cr concentration was over 30 at. % at any position in the first magnetic layer 18 and the second magnetic layer 19. Magnetization is almost lost in Co—Cr alloys with Cr concentration of 30 at. % or more. Namely, the magnetization in the track separators 24 was almost lost. From this result, it was recognized that the track separators 24 were formed to be able to separate recording tracks sufficiently.

As to the recording tracks, the Cr concentration was approximately 15 at. % at any position in the first magnetic layer 18 and the second magnetic layer 19; it was recognized that each layer had almost the same composition as the sputtered alloy. In the track separators 24, the implanted Cr went into a part of the second orientation control layer 17, but there is no problem.

As may be seen from the above, it was recognized that radiation of Cr ions in the amount of $1 \times 10^{16}/cm^2$ or more may sufficiently improve the track density in the present embodiment.

Discrete track media were prepared in the same manner as the Example 1, except that the nonmagnetic layer 20 and the non-magnetic element ions 23 of the Example 1 were substituted with other elements. For the nonmagnetic layer 20 and the nonmagnetic element ions 22, any material selected from the group consisting of Mo, W, V, Nb, Ta, Ti, Zr, Hf, Ru, B, C Si, and Ge was used.

Figure 35:
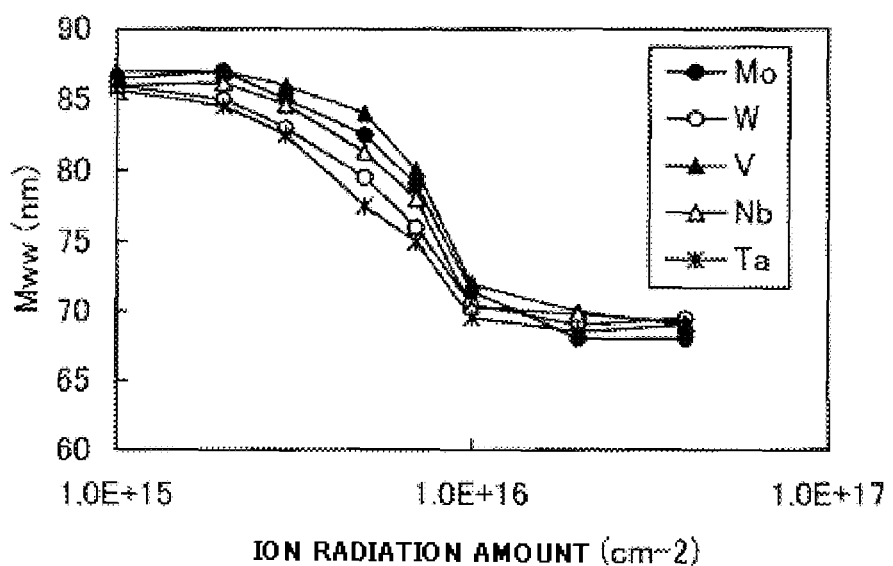
FIG. 35 is a drawing showing evaluation results of magnetic recording width Mww.
Figure 36:
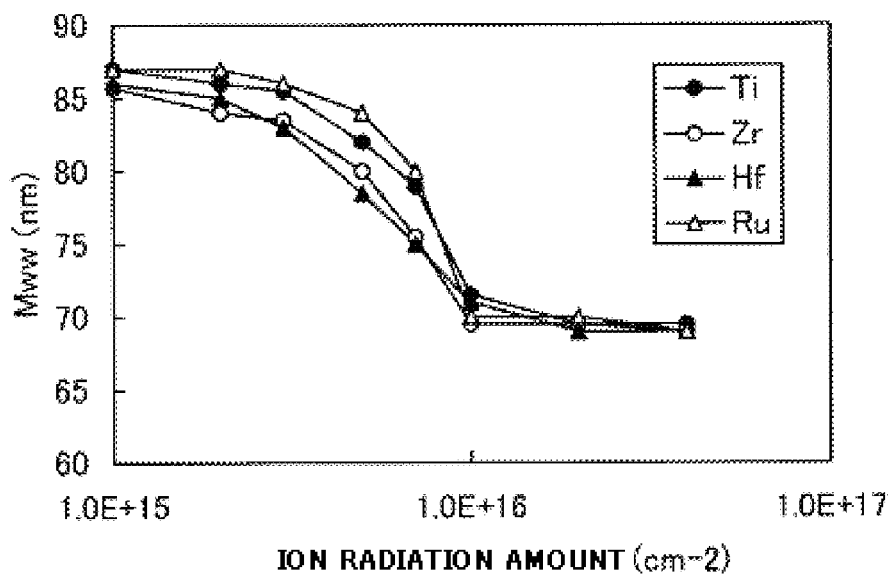
FIG. 36 is a drawing showing evaluation results of magnetic recording width Mww.
Figure 37:
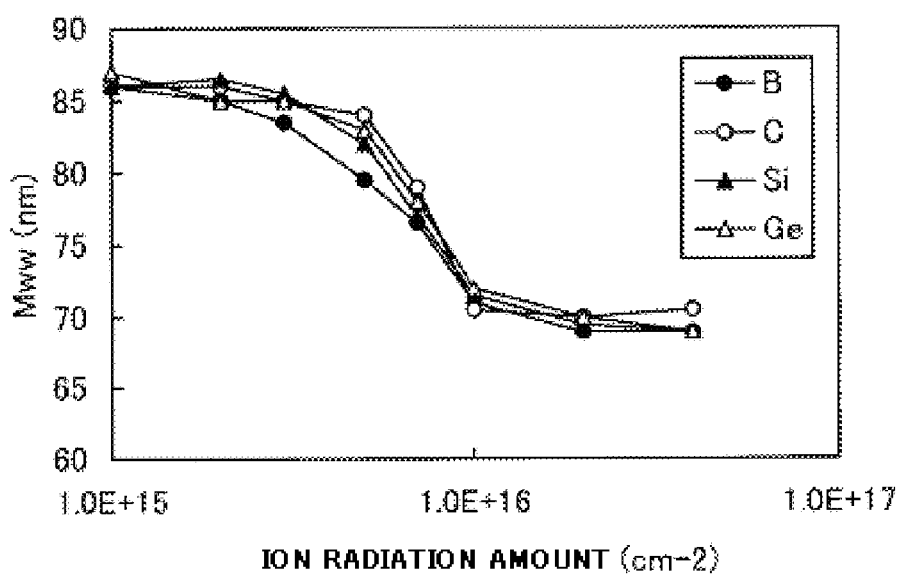
FIG. 37 is a drawing showing evaluation results of magnetic recording width Mww.

The Mww was evaluated using the same head as the Example 1. The results are shown in FIGS. 35 to 37. First, at the point where the radiation amount of nonmagnetic element was the least, the Mww was about 85 nm in each element, which was almost the same as the Mww in the Example 1 in the same radiation amount. In the area where the radiation amount of nonmagnetic element ions 23 was $1 \times 10^6/cm^2$ or less, the Mww gradually decreased with increase in the radiation amount in every element, but the value of the Mww had some variation. However, in the area where the radiation amount of nonmagnetic element ions 23 was $1 \times 10^{16}/cm^2$ or more, the Mww was about 70 nm in every element, which was almost the same as the Mww in the Example 1 in the same radiation amount.

That is, it was recognized that track density of the same level as the Example 1 may be achieved by radiating the amount of $1 \times 10^{16}/cm^2$ or more in each element.

However, in the media using Mo, W, V, Nb, Ti, Zr, Hf, and Ru, corrosion resistance was slightly deteriorated compared with the media using Cr, although there would be no problem. In the media using B, C, Si, and Ge, the medium surface became slightly rougher after forming the nonmagnetic layer 20, which was not such a level to obviously affect the flying performance. The media using C, however, had better corrosion resistance than the media in the Example 1. In the case using Ta for the nonmagnetic layer 20, the same level of media as the media in the Example 1 in corrosion resistance and surface roughness was obtained.

Discrete track media without the nonmagnetic layer 20 in the Example 1 were prepared according to the following method and was evaluated.

Figure 9:
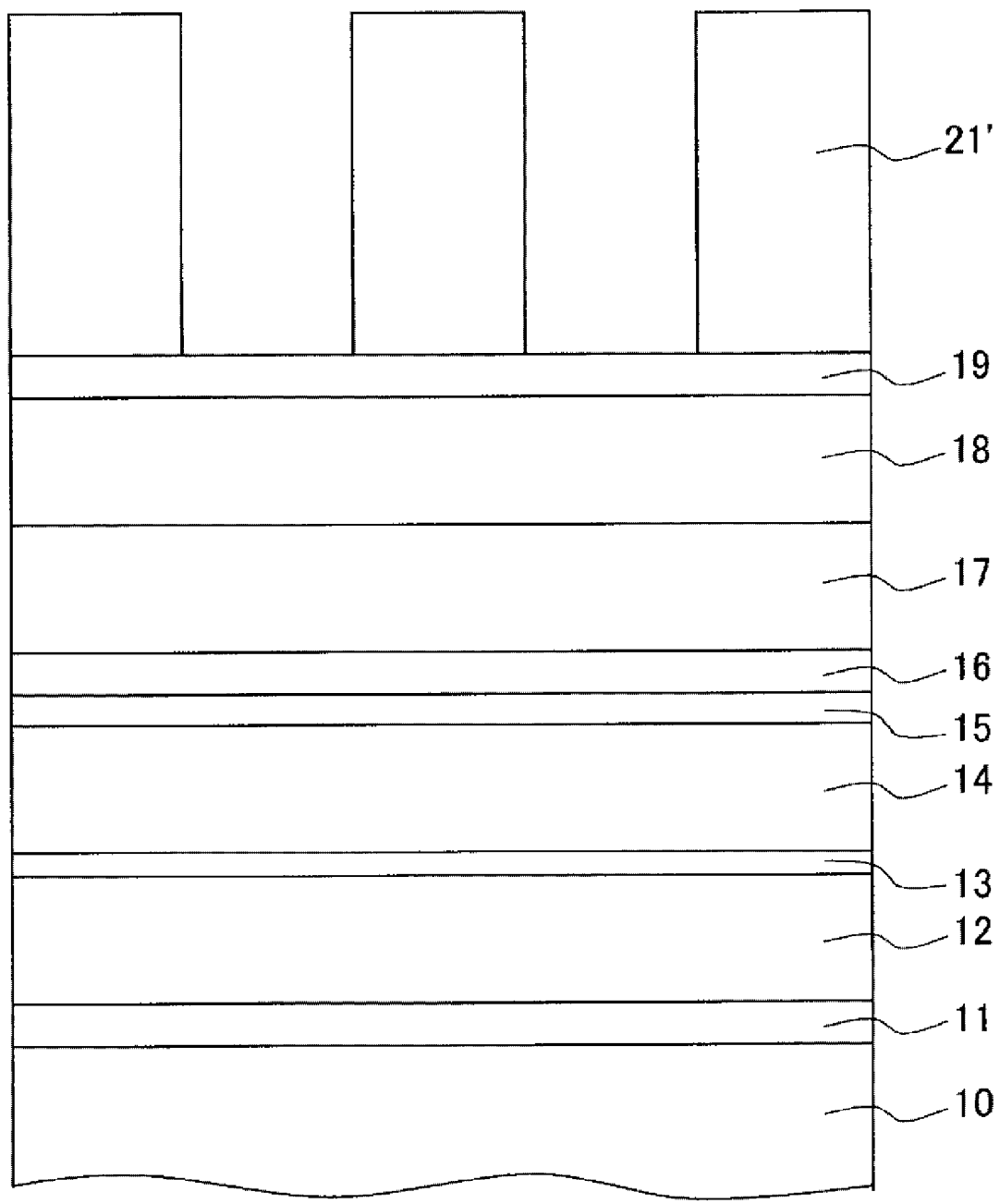
FIG. 9 is a drawing showing a manufacturing step of a magnetic recording medium according to Comparative Example 1.
Figure 10:
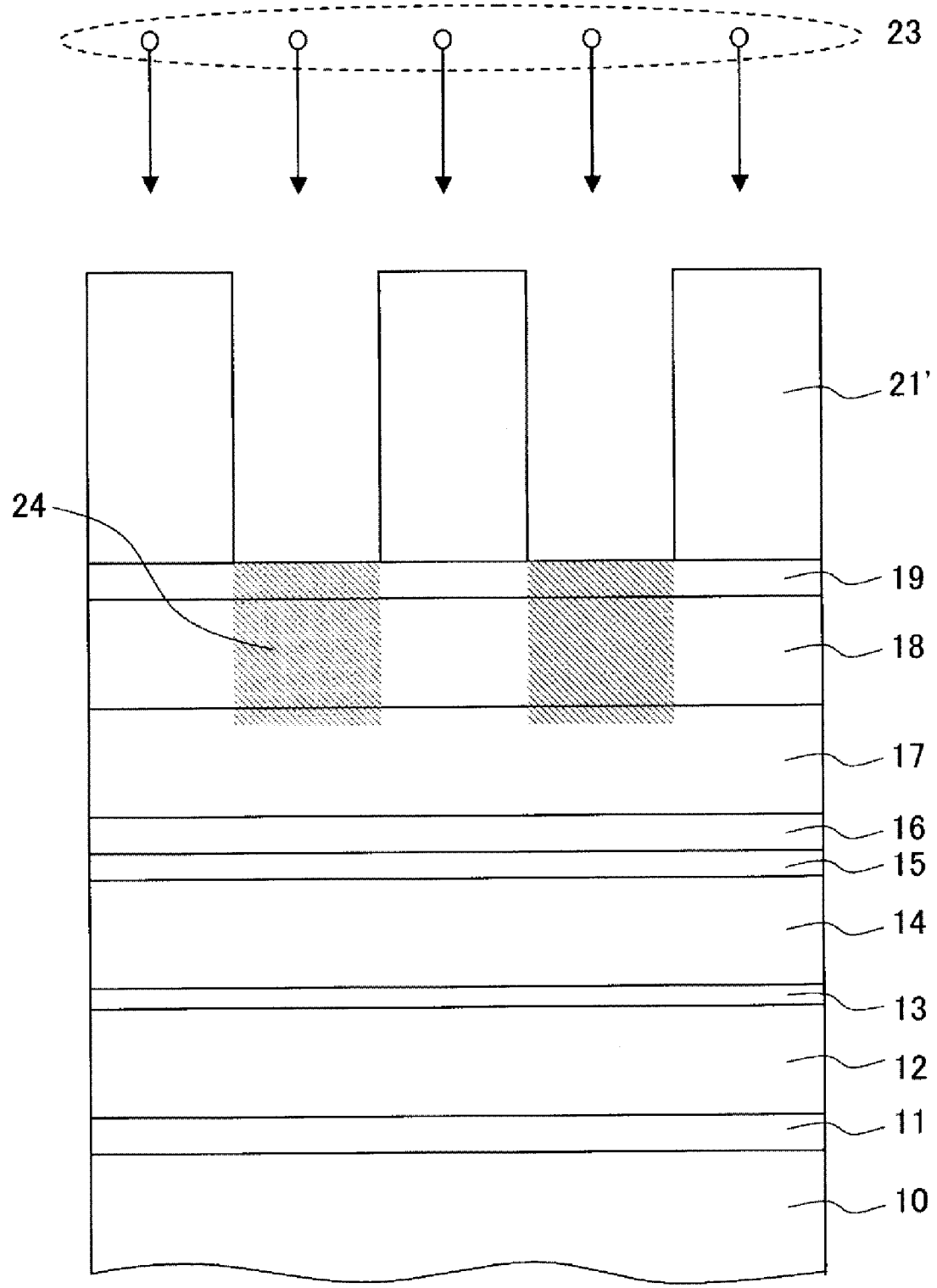
FIG. 10 is a drawing showing a manufacturing step of a magnetic recording medium according to Comparative Example 1.

After forming up to the second magnetic layer 19 in the same manner as Example 1, a resist pattern 21' was formed in the same manner as Example 1 (FIG. 9). Cr ions as nonmagnetic element ions 23 were radiated in the same manner as Example 1 to form more concentrated parts 24 of nonmagnetic element in some parts of the first magnetic layer 18 and the second magnetic layer 19 (FIG. 10). The Cr radiation amount was $1 \times 10^{15}$ to $1 \times 10^{17}/cm^2$.

Figure 11:
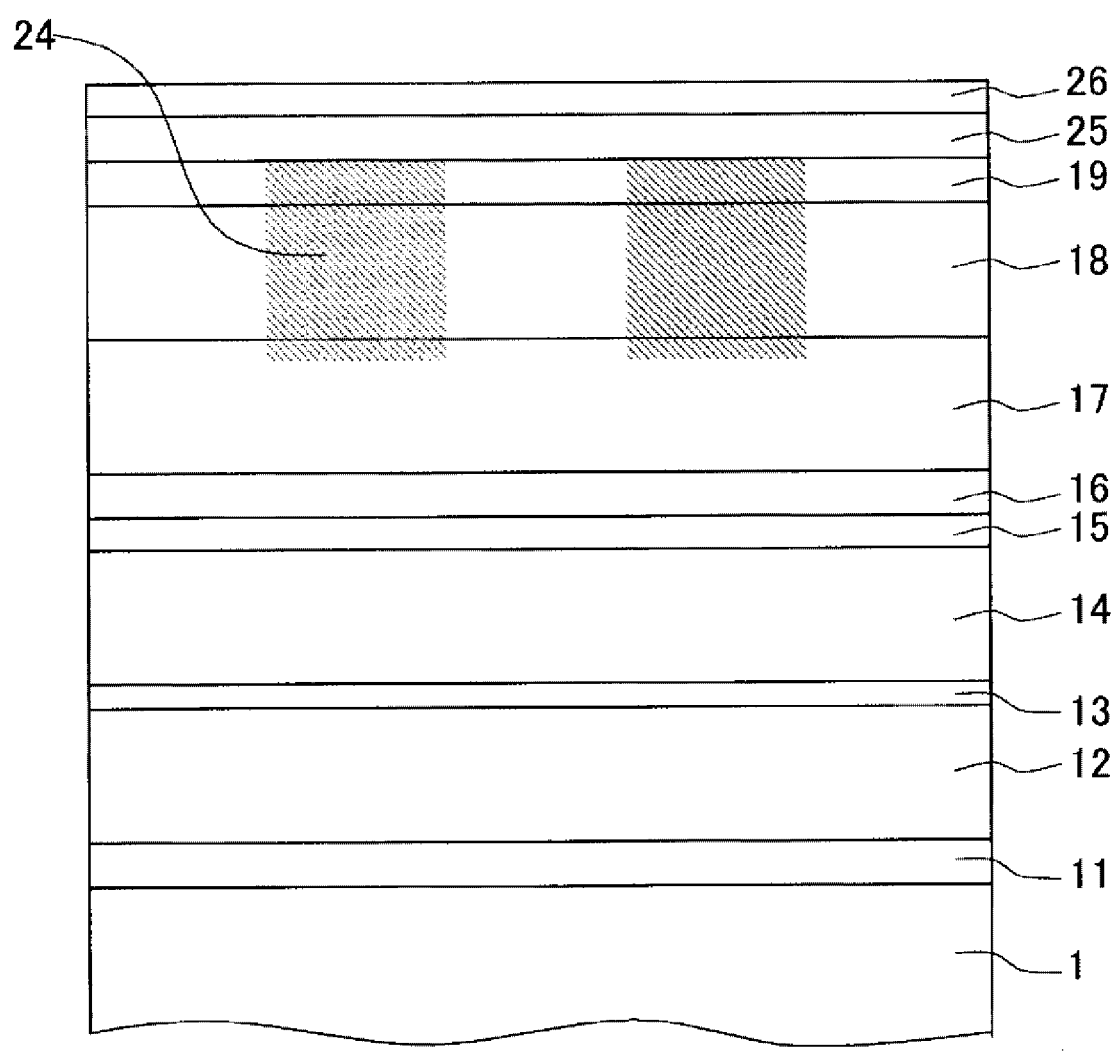
FIG. 11 is a drawing showing a manufacturing step of a magnetic recording medium according to Comparative Example 1.

Then, the resist pattern 21' was removed in the same manner as the Example 1, a DLC protection film 25 in the thickness of 4 nm was formed, and a lubrication film 26 was formed (FIG. 11). To match the distance between the magnetic layer and the head with the one in the media of the Example 1, the DLC protection film 25 was made thick.

Figure 38:
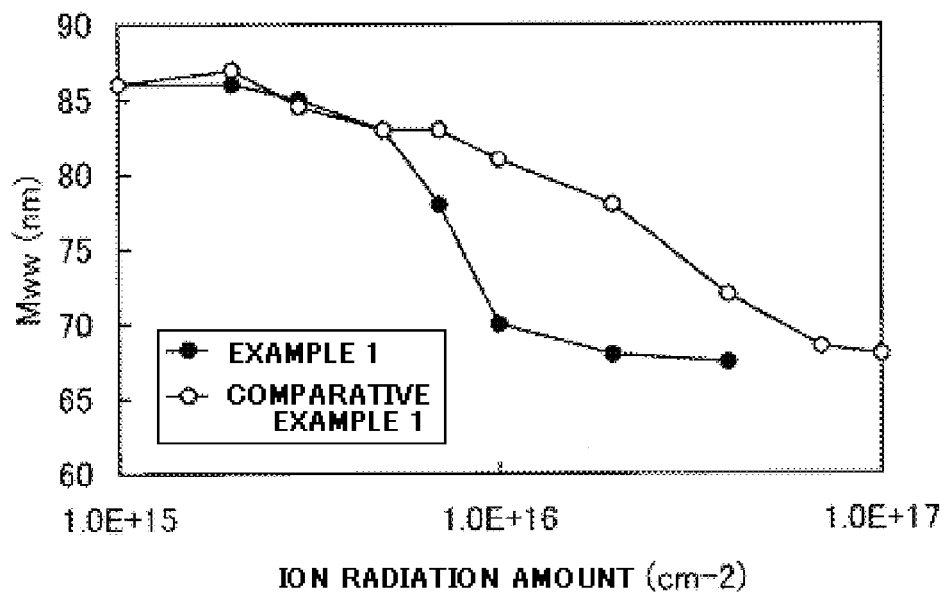
FIG. 38 is a drawing showing evaluation results of magnetic recording width Mww.

The Mww was evaluated with a spin-stand using the same head as the one used to evaluate the media of the Example 1. The results are shown in FIG. 38. It was recognized that, in the area where the Mww was sufficiently reduced in the radiation amount of $1 \times 10^{16}/cm^2$ or more in the Example 1, the Mww in the present comparative example was wider. This is because the nonmagnetic atoms (Cr in the present comparative example) were diffused from the nonmagnetic layer 20, too, if it was present like the Example 1, so that the concentration of the nonmagnetic atoms in the track separators 24 became high enough to separate tracks, but if the nonmagnetic layer 20 was not present, there was no diffusion of nonmagnetic atoms from the nonmagnetic layer 20, so that the concentration of the nonmagnetic atoms in the track separators 24 was not enough to separate the tracks. When the radiation amount was increased to $7 \times 10^{16}/cm^2$ or more, however, the Mww was decreased to about 70 nm, which was almost the same as the media of the Example 1 in the radiation amount of $1 \times 10^{16}/cm^2$ or more.

Output variation with time was measured on the media of the present comparative example with Cr ion radiation amount of $1 \times 10^{17}/cm^2$ and the media of the Example 1 with Cr ion radiation amount of $2 \times 10^{16}/cm^2$ with a spin-stand and thermal demagnetization was evaluated. At the measurement, the temperature was 70° C. and the linear recording density was 24 kFC/mm and the evaluation was made by comparing the output after 10,000 seconds with the output immediately after a recording operation. In the media of the Example 1 with radiation amount of $2 \times 10^{16}/cm^2$, the output after 10,000 seconds was decreased by about 1% compared with the one immediate after a recording operation. On the contrary, it was recognized that in the media of the present comparative example with radiation amount of $1 \times 10^{17}/cm^2$, the decreased rate in the output was about 5% and the thermal demagnetization progresses about five times quicker than the media of the Example 1.

Such difference in thermal demagnetization characteristics may be explained as follows. If the radiation amount of nonmagnetic element (Cr in the present example) ions 23 is smaller, the amount of the radiated ions diffused to reach the recording tracks is small enough to cause such damage that the magnetic property of the recording tracks changes. However, if the ion radiation amount increases, the amount of ion diffusion to the recoding tracks increases, so that the coercivity of the recording tracks decreases to remarkably deteriorate the thermal demagnetization characteristics.

The above-described phenomenon that nonmagnetic atoms diffuse from the nonmagnetic layer 20 appears in the same manner even if the film thickness of the nonmagnetic layer changes. There is no specific problem when the nonmagnetic layer 20 becomes thinner, but as it becomes thicker, the spacing loss between the magnetic head and the recording medium becomes larger and the recording and reproducing performance are deteriorated. Then, the spacing may be adjustable by thinning the DLC protection film 25, but too thin protection film may cause deterioration in coverage of the film, which in turn looses the reliability. In consideration of the reliability, the DLC protection film should be 2 nm or more in thickness, so that the thickness of the nonmagnetic layer 20 is defined as 2 nm in the Example 1 as the conditions not to extremely deteriorate the spacing.

COMPARATIVE EXAMPLE 2

Discrete track media where the main component of the nonmagnetic layer 20 and the nonmagnetic element ions 23 in the Example 1 were substituted with a different element were prepared by the following method and evaluated.

After forming up to the second magnetic layer 19 in the same manner as the Example 1, a 2 nm of Mo layer was stacked as a nonmagnetic layer 20 (FIG. 1). Next, a resist pattern 21' was formed in the same manner as the Example 1 (FIG. 5). Then, Cr ions are radiated as nonmagnetic element ions 23 in the same manner as the Example 1 to form track separators 24 on some parts of a first magnetic layer 18 and a second magnetic layer 19 (FIG. 6). After that, the resist pattern 21' was removed, a DLC protection film 25 was formed, and a lubrication film 26 was formed (FIG. 8).

Figure 39:
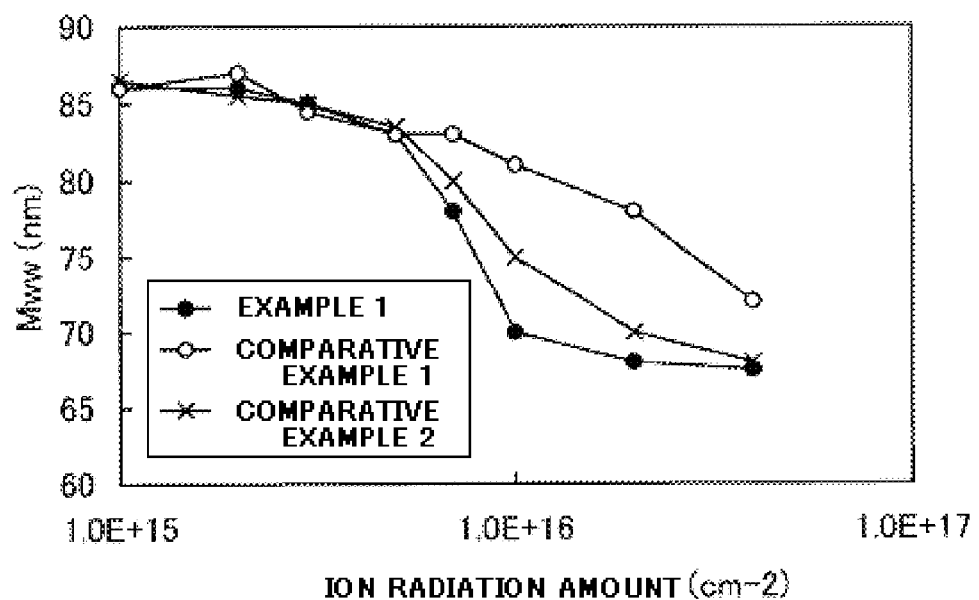
FIG. 39 is a drawing showing evaluation results of magnetic recording width Mww.

The Mww was evaluated in the same manner as the Example 1. The results are shown in FIG. 39. In the media of the present comparative example, the Mww was larger than the media of the Example 1 in the area with the radiation amount of $1 \times 10^{16}/cm^2$ or more, but was smaller than the media of the Comparative Example 1. This is because the main component of the nonmagnetic layer 20 and the nonmagnetic element ions 23 to be radiated are different so that the way of diffusion of atoms from the nonmagnetic layer 20 was changed.

In the media of the present comparative example, the corrosion resistance in the recording tracks was remarkably deteriorated than the media of the Example 1. This is because that the elements different in the ionization tendency were disposed on the medium surface and between tracks.

EXAMPLE 3

Discrete track media were prepared according to the following method and evaluated.

Figure 12:
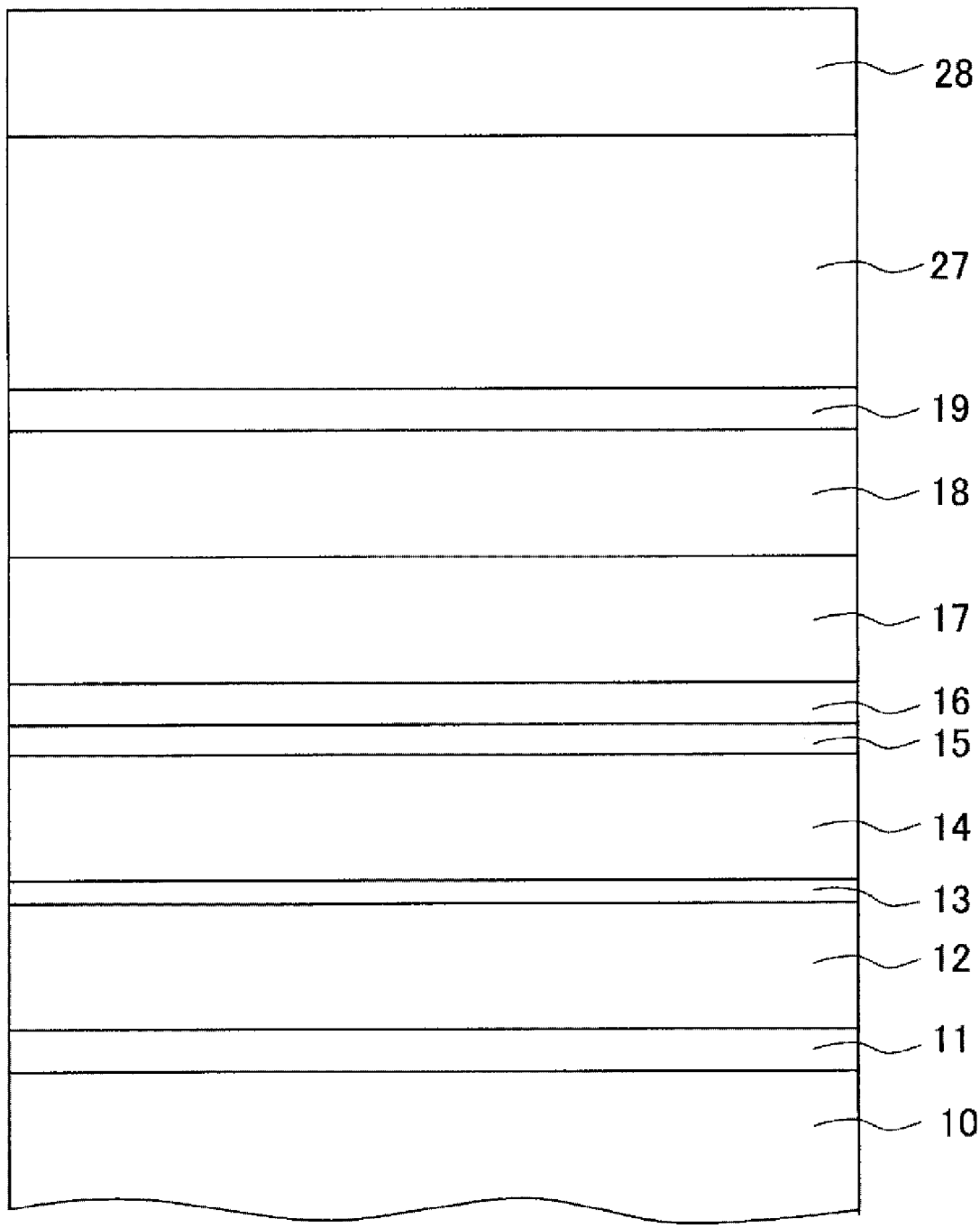
FIG. 12 is a drawing showing a manufacturing step of a magnetic recording medium according to Example 3.
Figure 13:
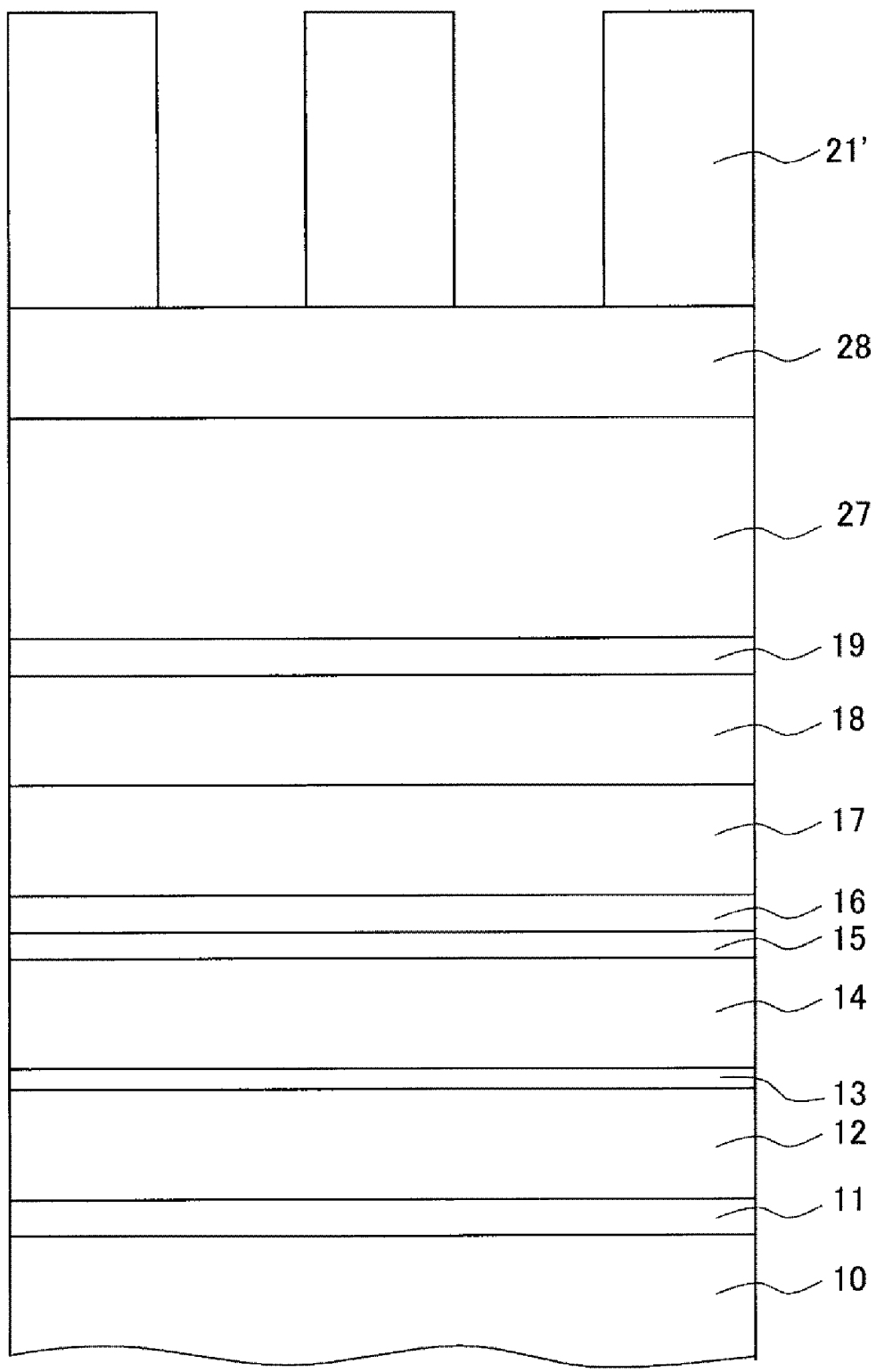
FIG. 13 is a drawing showing a manufacturing step of a magnetic recording medium according to Example 3.
Figure 14:
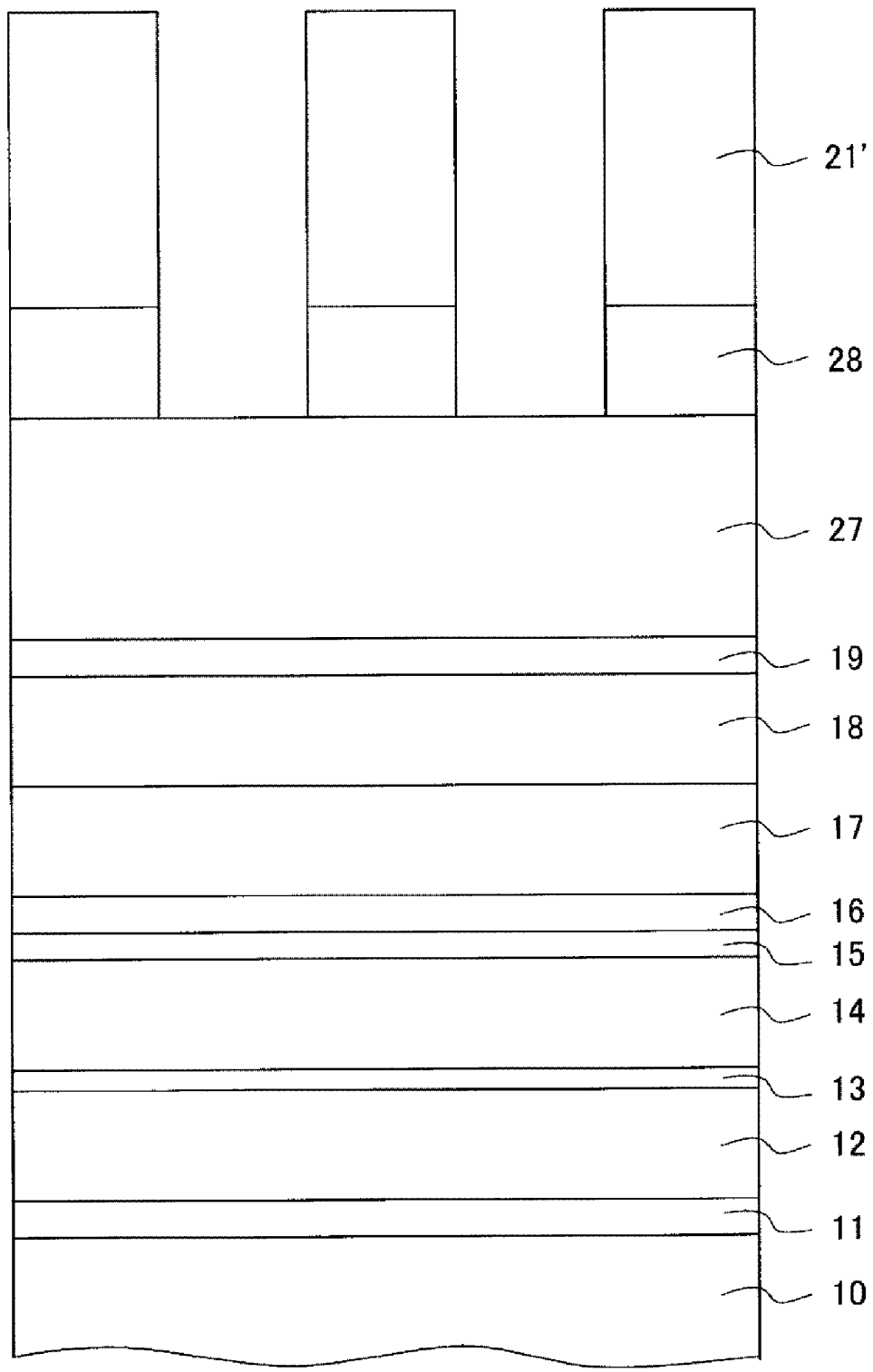
FIG. 14 is a drawing showing a manufacturing step of a magnetic recording medium according to Example 3.
Figure 15:
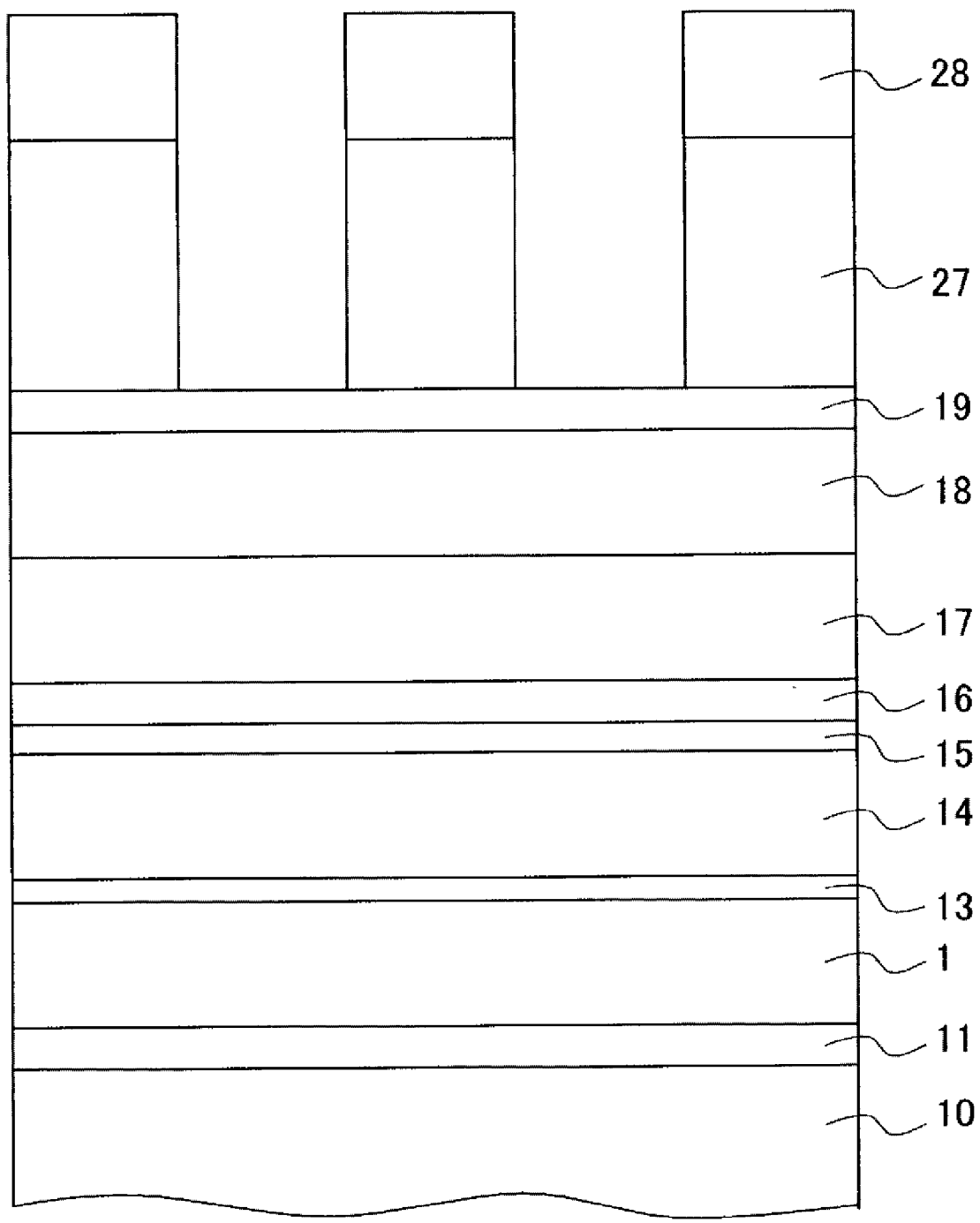
FIG. 15 is a drawing showing a manufacturing step of a magnetic recording medium according to Example 3.

After forming up to the second magnetic layer 19 in the same manner as the Example 1, a 50 nm of C layer as a first mask layer 27 and a 20 nm of Ta layer as a second mask layer 28 were formed (FIG. 12). Then, a resist pattern 21' was formed in the same manner as Example 1 (FIG. 13). Then, the second mask layer 28 under the apertures of the resist pattern 21' was etched by RIE using CF4 gas to copy the resist pattern onto the second mask layer 28 (FIG. 14). After that, the resist pattern 21' and the first mask layer 27 under the apertures of the second mask layer 28 were etched by RIE using oxygen to copy the pattern of the second mask layer 28 onto the first mask layer 27 (FIG. 15). All the resist pattern 21' was removed by the RIE using oxygen when the pattern of the first mask layer 27 was formed.

Figure 16:
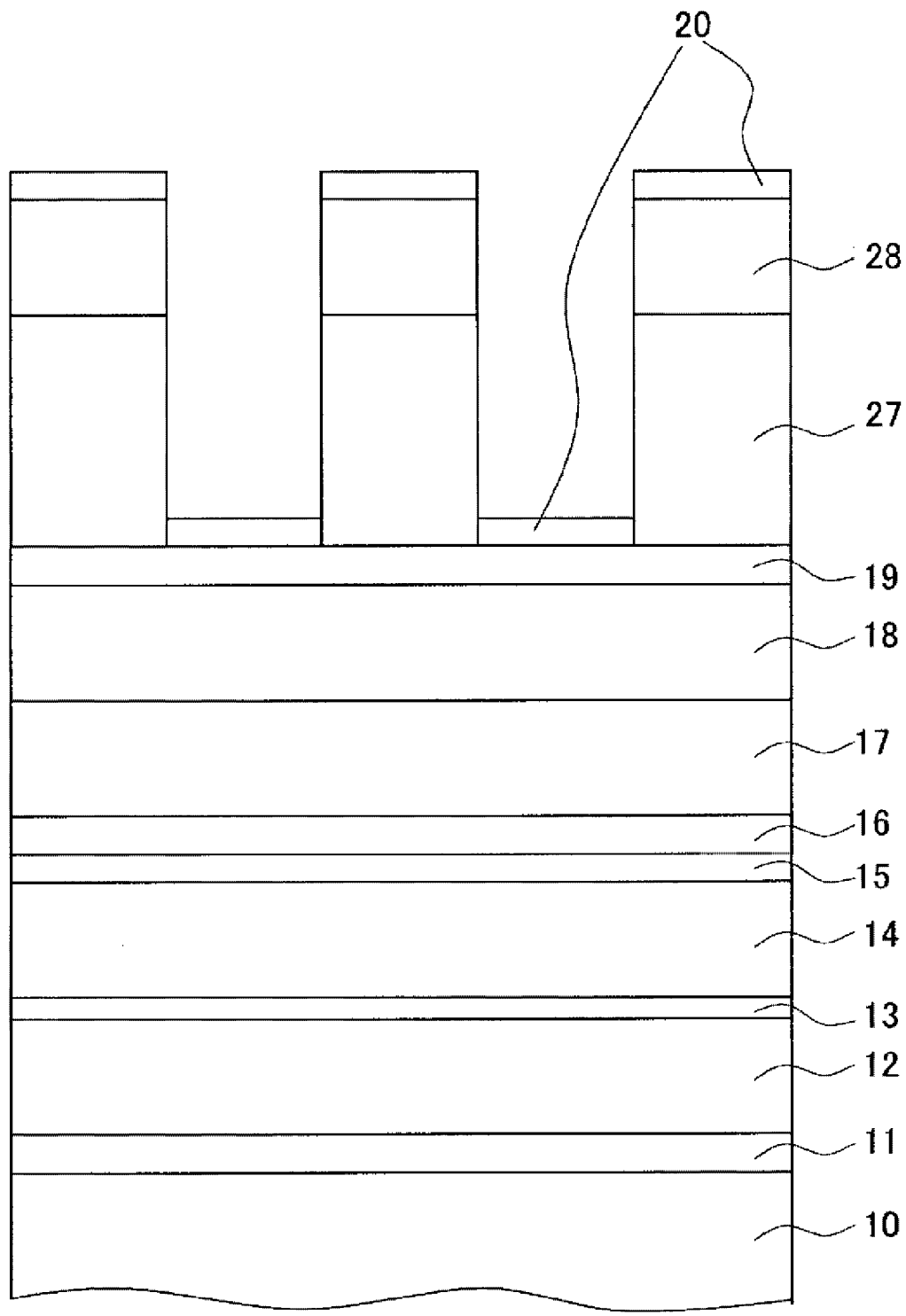
FIG. 16 is a drawing showing a manufacturing step of a magnetic recording medium according to Example 3.
Figure 17:
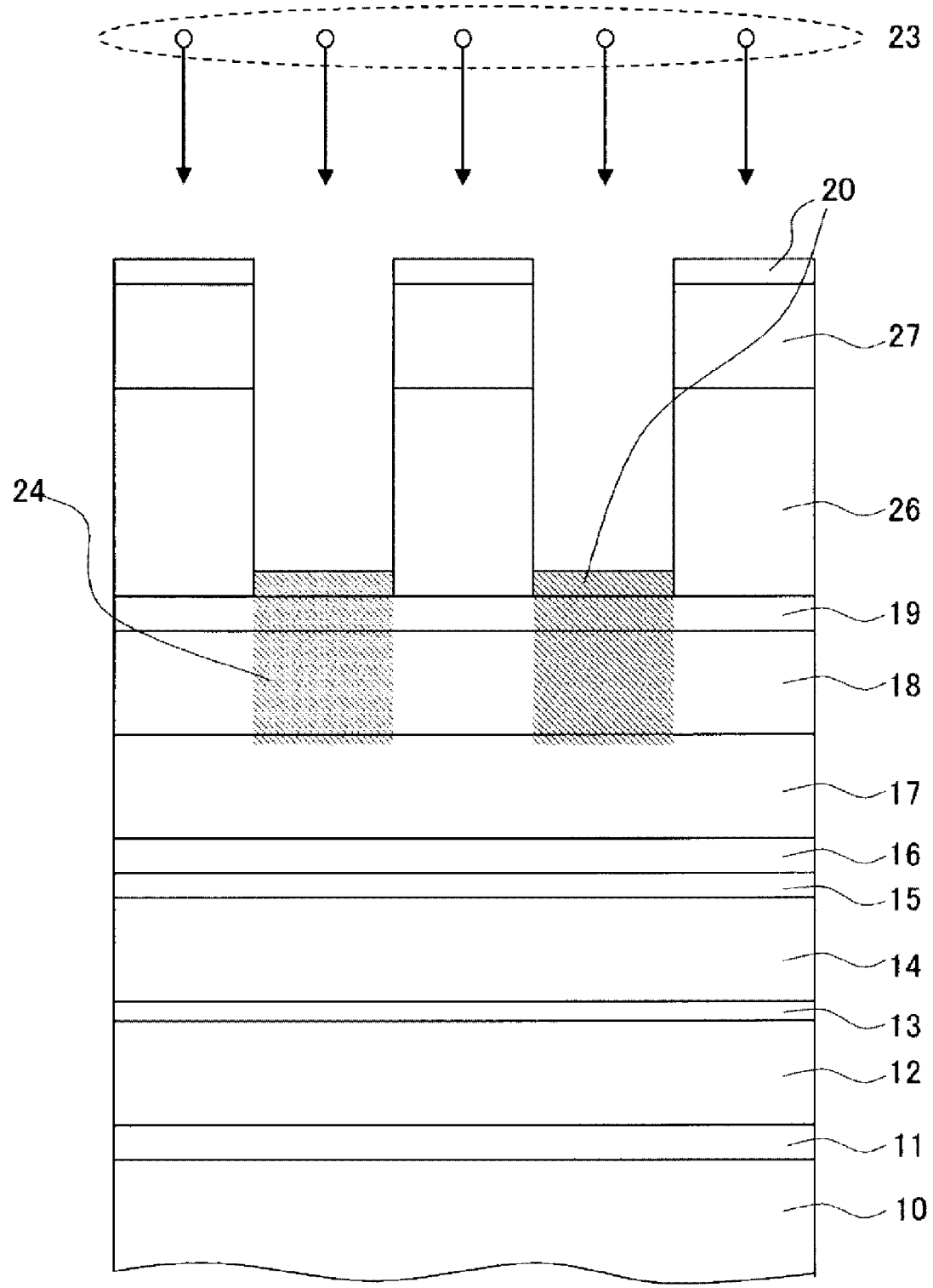
FIG. 17 is a drawing showing a manufacturing step of a magnetic recording medium according to Example 3.
Figure 18:
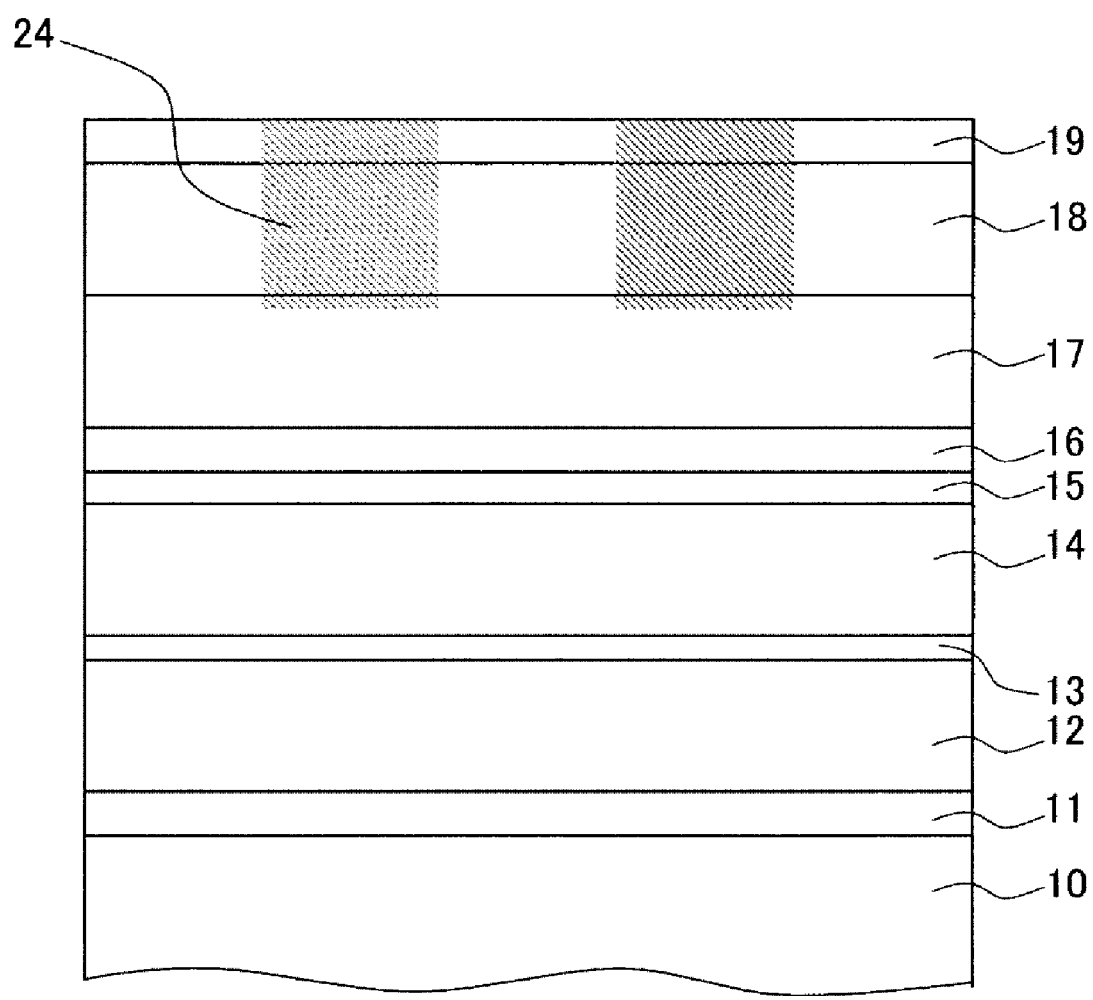
FIG. 18 is a drawing showing a manufacturing step of a magnetic recording medium according to Example 3.
Figure 19:
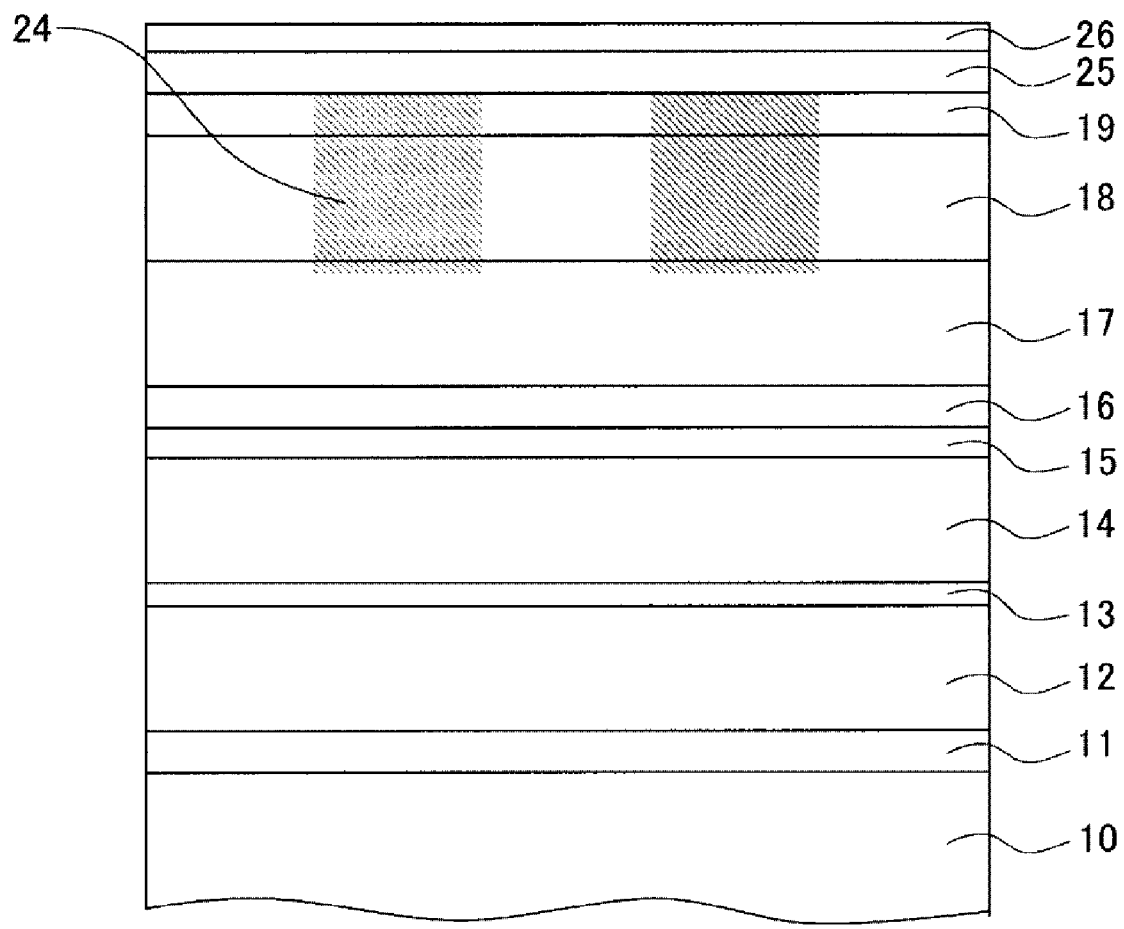
FIG. 19 is a drawing showing a manufacturing step of a magnetic recording medium according to Example 3.

Then, a 2 nm of Ta layer was formed as a nonmagnetic layer 20 on the second mask layer 28 and on the second magnetic layer 19 on the bottom of the apertures (FIG. 16). Then, Ta ions were radiated to the medium as nonmagnetic element ions 23 using a plasma beam and formed more concentrated parts 24 of the nonmagnetic element (Ta in the present example) on some parts of the first magnetic layer 18 and the second magnetic layer 19 (FIG. 17). The acceleration voltage at the Ta ion radiation was 28 kV and the radiation amount was $1 \times 10^{15}$ to $4 \times 10^{16}/cm^2$. Then, the second mask layer 28 and the nonmagnetic layer 20 were removed by RIE using CF4 gas and the first mask layer 27 was removed by RIE using oxygen (FIG. 18). Then, a 4 nm of DLC protection film 25 was formed in the same manner as the Example 1 and the lubrication film 26 was formed (FIG. 19).

Figure 40:
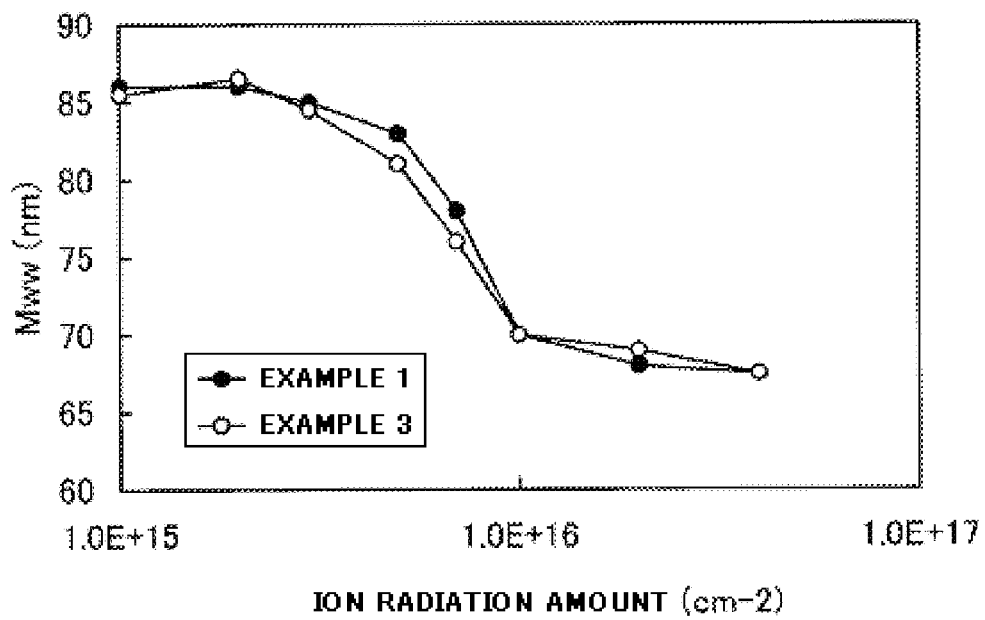
FIG. 40 is a drawing showing evaluation results of magnetic recording width Mww.

The Mww was evaluated in the same manner as the Example 1. The results are shown in FIG. 40. As to the dependency of Mww on the radiation amount of the nonmagnetic element ions 23, a tendency similar to the Example 1 was observed. That is, at the least radiation amount, the Mww was about 85 nm, and with increase in the radiation amount, the Mww gradually decreased until the radiation amount became $1 \times 10^{16}/cm^2$. In the area where the radiation amount was $1 \times 10^{16}/cm^2$ or more, the Mww became stable around 70 nm.

That is to say, the track density equivalent to the one in the Example 1 may be obtained by the method of the present example, if the radiation amount of the nonmagnetic element ions 23 was $1 \times 10^{16}/cm^2$ or more.

EXAMPLE 4

Discrete track media were prepared by the following method and evaluated.

Figure 20:
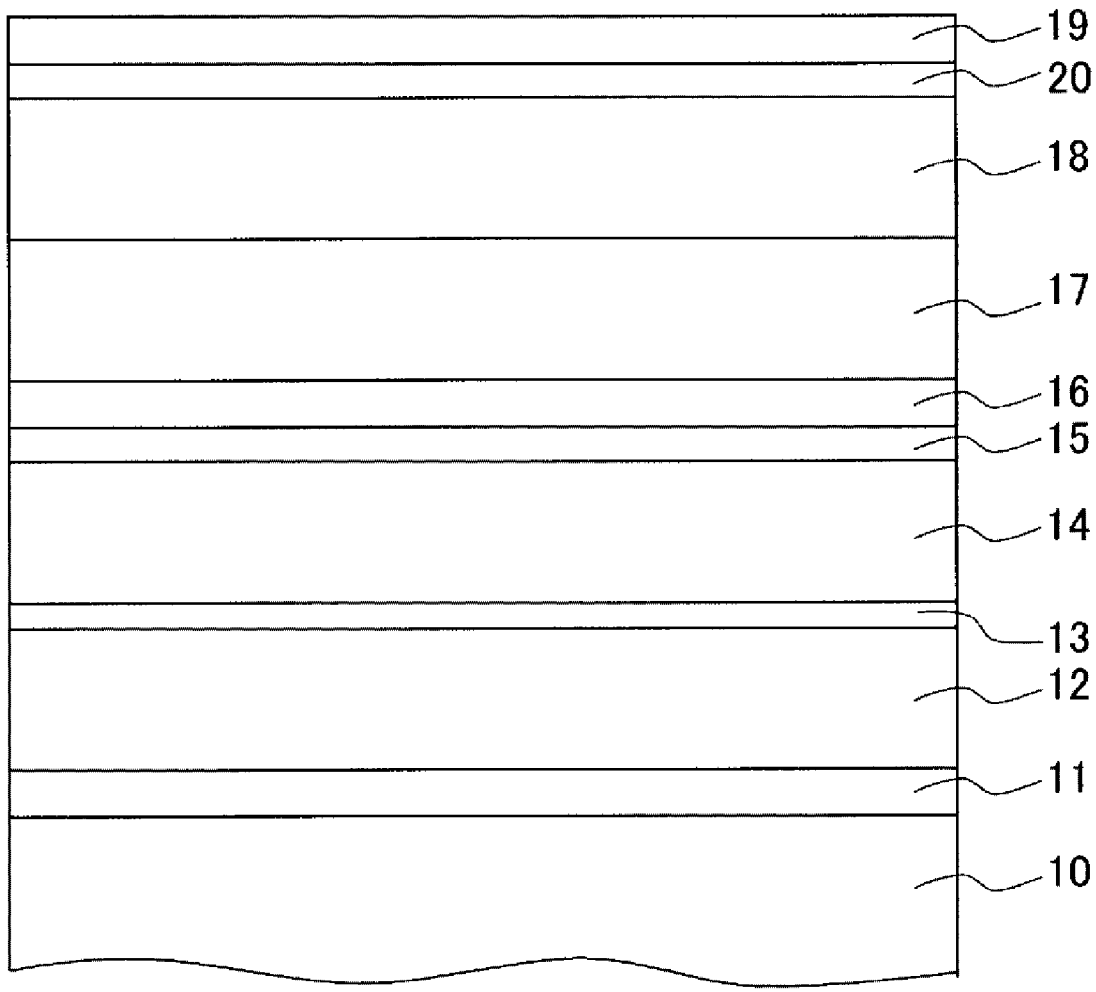
FIG. 20 is a drawing showing a manufacturing step of a magnetic recording medium according to Example 4.
Figure 21:
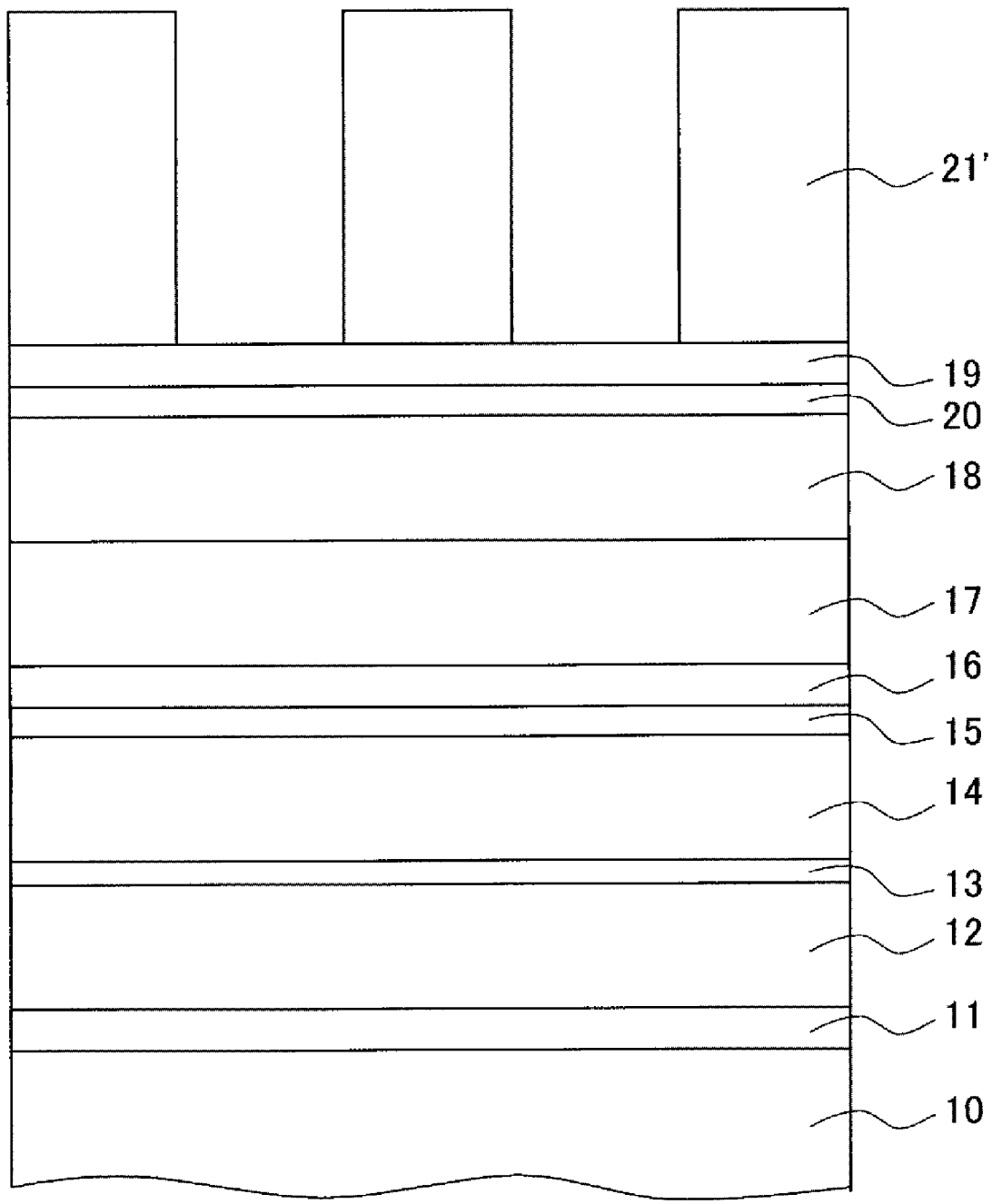
FIG. 21 is a drawing showing a manufacturing step of a magnetic recording medium according to Example 4.

After forming up to the first magnetic layer 18 in the same manner as Example 1, a 70 at. % Ru—30 at. % Cr layer with a thickness of 1 nm as a nonmagnetic layer 20, a 64 at. % Co—12 at. % Cr—14 at. % Pt—10 at. % B layer with a thickness of 6 nm as a second nonmagnetic layer 19 were stacked in this order (FIG. 20). A resist pattern 21' was formed thereon in the same manner as the Example 1 (FIG. 21).

Figure 22:
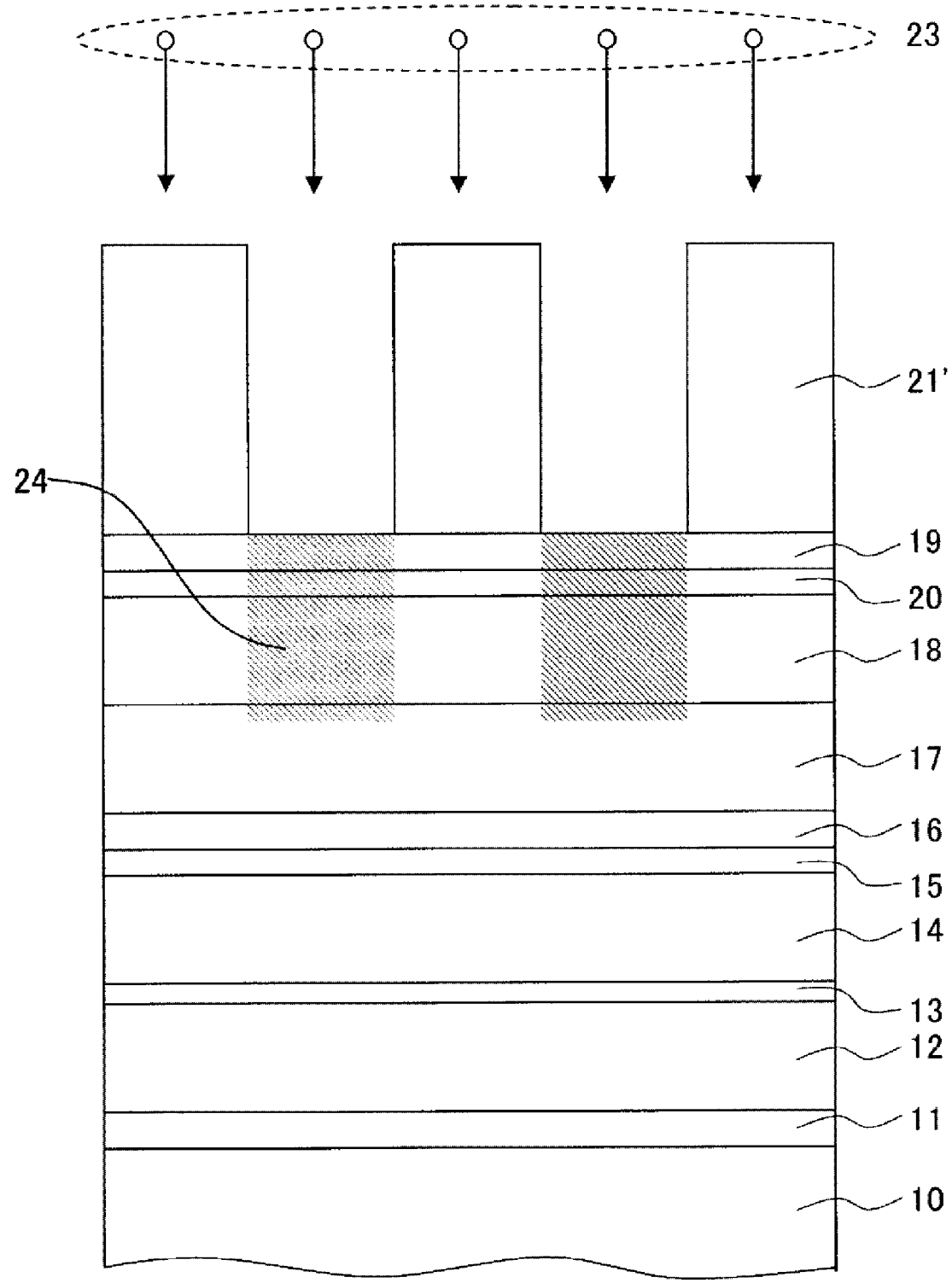
FIG. 22 is a drawing showing a manufacturing step of a magnetic recording medium according to Example 4.
Figure 23:
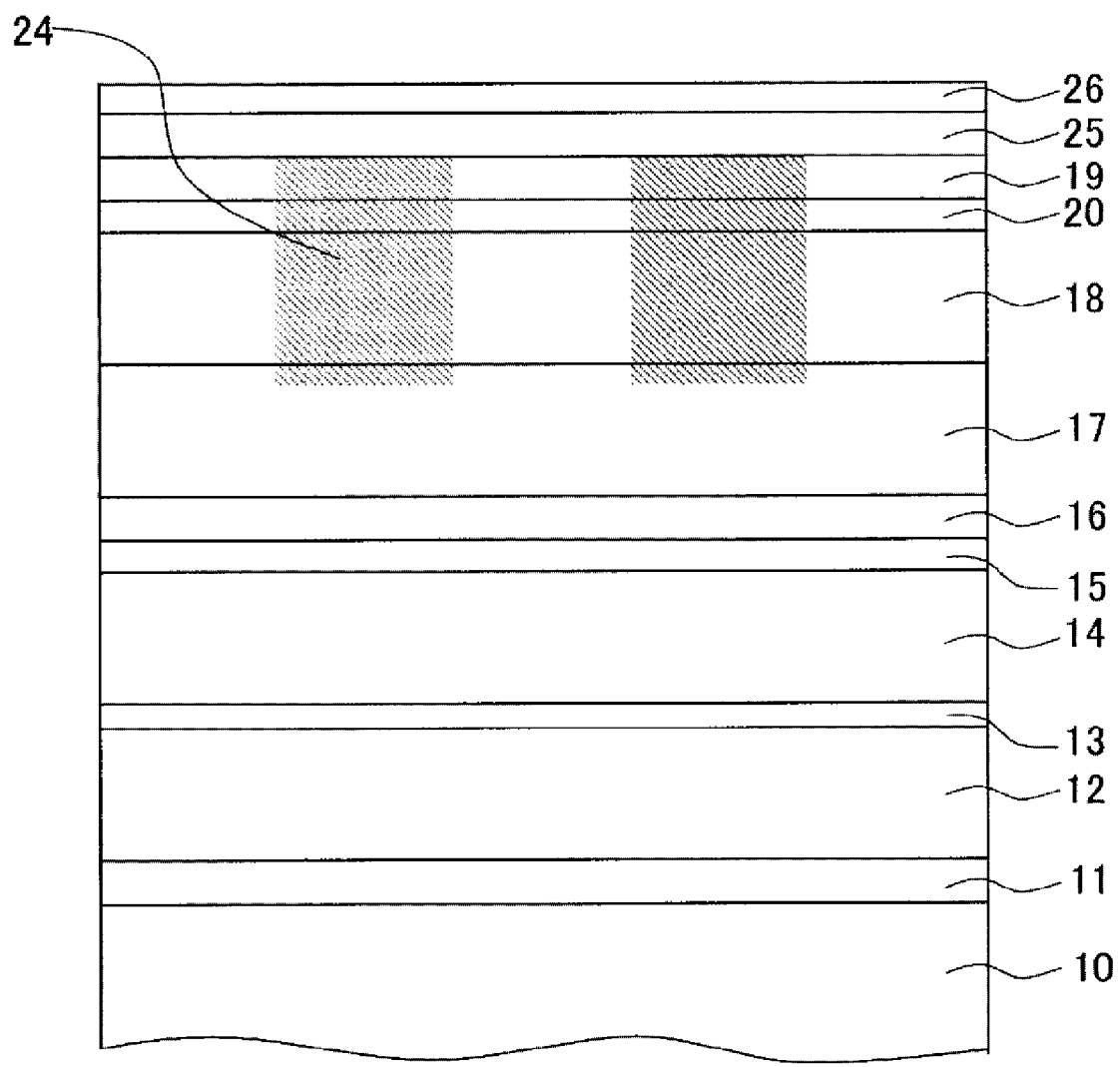
FIG. 23 is a drawing showing a manufacturing step of a magnetic recording medium according to Example 4.

Then, Ru ions were radiated onto the medium as nonmagnetic element ions 23 with a plasma beam to form more concentrated parts 24 of nonmagnetic element (Ru in the present example) on some parts of the first magnetic layer 18 and the second magnetic layer 19 (FIG. 22). The acceleration voltage at the Ru ion radiation was 23 kV and the radiation amount was $1 \times 10^{15}$ to $4 \times 10^{16}/cm^2$. Then, the resist pattern 21' was removed in the same manner as the Example 1, and the DLC protection film 25 in the thickness of 4 nm and then the lubrication film 26 were formed (FIG. 23).

Figure 41:
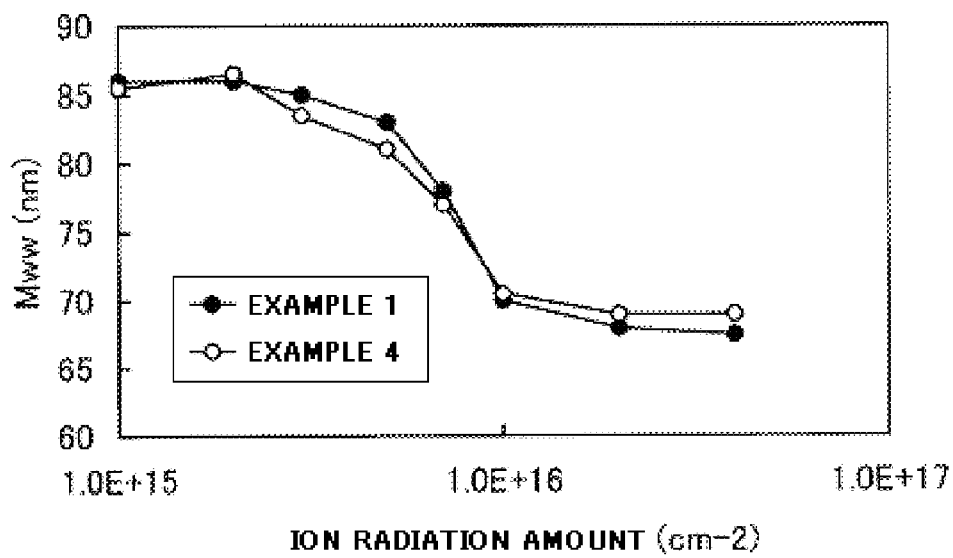
FIG. 41 is a drawing showing evaluation results of magnetic recording width Mww.

The Mww was evaluated in the same manner as the Example 1. The results are shown in FIG. 41. As to the dependency of Mww on the radiation amount of nonmagnetic element ions 23, a tendency similar to the Example 1 was observed. That is, at the least radiation amount, Mww was about 85 nm, and with increase in the radiation amount, the Mww gradually decreased until the radiation amount became $1 \times 10^{16}/cm^2$. In the area where the radiation amount was $1 \times 10^{16}/cm^2$ or more, the Mww became stable around 70 nm.

The reason why media showing the similar Mww to the Example 1 may be obtained is, even if the nonmagnetic layer 20 is formed between the first magnetic layer 18 and the second magnetic layer 19, nonmagnetic atoms (Ru in the present example) from the nonmagnetic layer 20 are diffused at the radiation of the nonmagnetic element ions 23 like the Example 1. This phenomenon that the nonmagnetic atoms diffuse from the nonmagnetic layer 20 appears in the same manner even if the film thickness of the nonmagnetic layer 20 changes, but if the nonmagnetic layer 20 is formed between the magnetic layers as in the present embodiment, the film thickness of the nonmagnetic layer 20 should be 2 nm or less to prevent the recording and reproducing performance from being deteriorated caused by deterioration in crystal orientation of the magnetic layer and remarkable weakened magnetic coupling between the magnetic layers That is to say, the track density equivalent to the one in the Example 1 may be obtained by the method of the present example, if the radiation amount of the nonmagnetic element ions 23 was $1\times10^{16}/cm^2$ or more.

EXAMPLE 5

Discrete track media where the material of the nonmagnetic layer 20 and the nonmagnetic element ions 23 in the Example 4 were changed into a different material were prepared. Using any one selected from the group of Ti, Cr, Mo and W as the material of the nonmagnetic layer 20 and the nonmagnetic element 23 to be radiated, media were prepared in the same manner as the Example 4.

Figure 42:
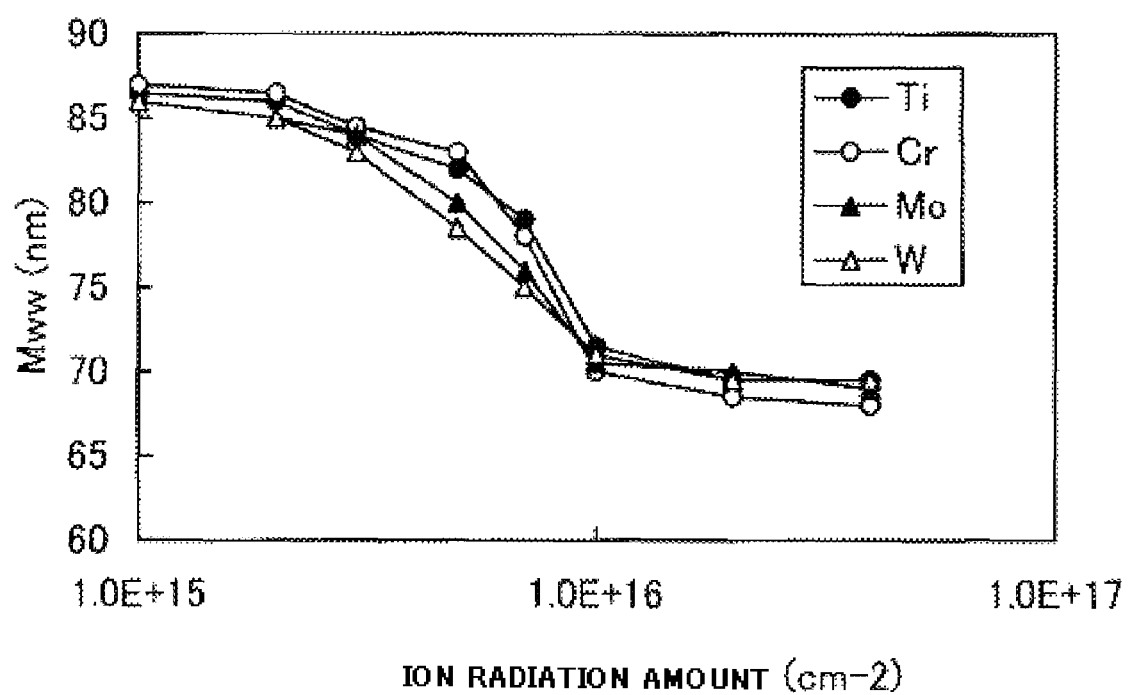
FIG. 42 is a drawing showing evaluation results of magnetic recording width Mww.

The results of evaluation on the Mww in the same manner as the Example 4 are shown in FIG. 42. First, at the point where the radiation amount of the nonmagnetic element was the least, the Mww was about 85 nm in each element, which was almost the same as the Mww in the Example 4 in the same radiation amount. In the area where the radiation amount of nonmagnetic element ions 23 was $1\times10^{16}/cm^2$ or less, the Mww gradually decreased with increase in the radiation amount in every element, but the value of the Mww had some variation. However, in the area where the radiation amount of nonmagnetic element ions 23 was $1\times10^{16}/cm^2$ or more, the Mww was about 70 nm in every element, which was almost the same value as the Mww in the Example 4 in the same radiation amount.

That is, it was recognized that track density of the same level as the Example 4 may be achieved by radiating the amount of $1\times10^{16}/cm^2$ or more in each element.

EXAMPLE 6

Bit patterned media were prepared by the method described below.

Figure 24:
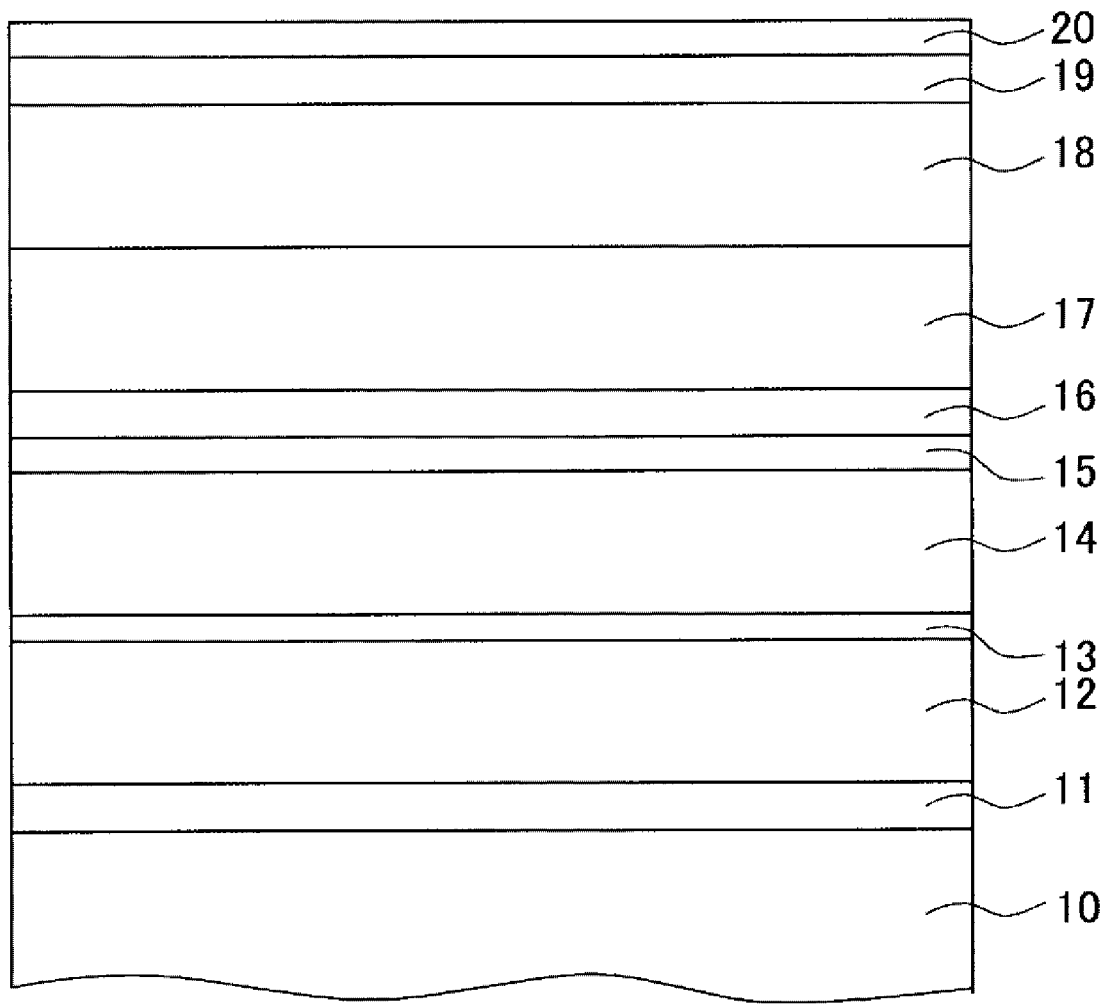
FIG. 24 is a drawing showing a manufacturing step of a magnetic recording medium according to Example 6.
Figure 25:
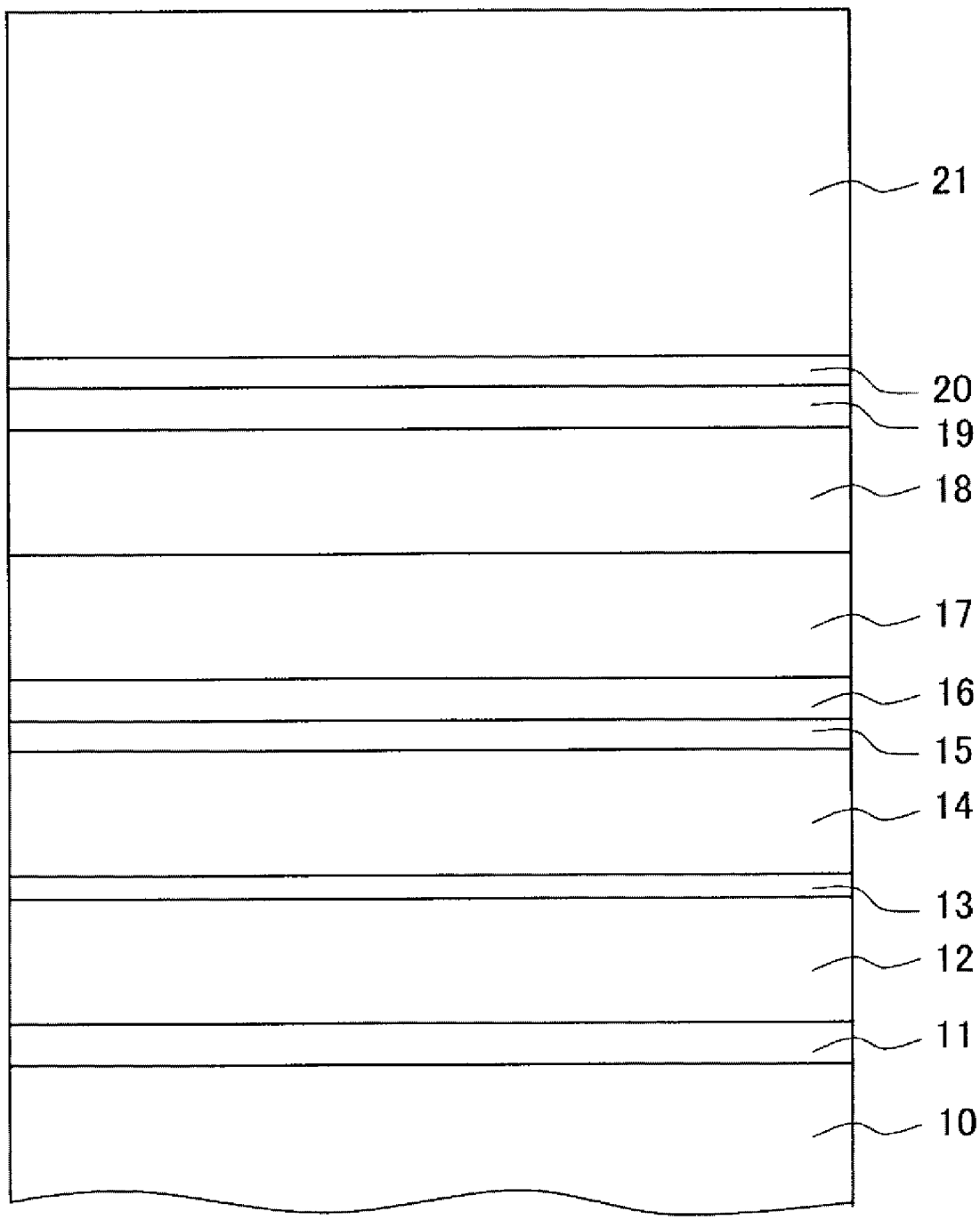
FIG. 25 is a drawing showing a manufacturing step of a magnetic recording medium according to Example 6.
Figure 26:
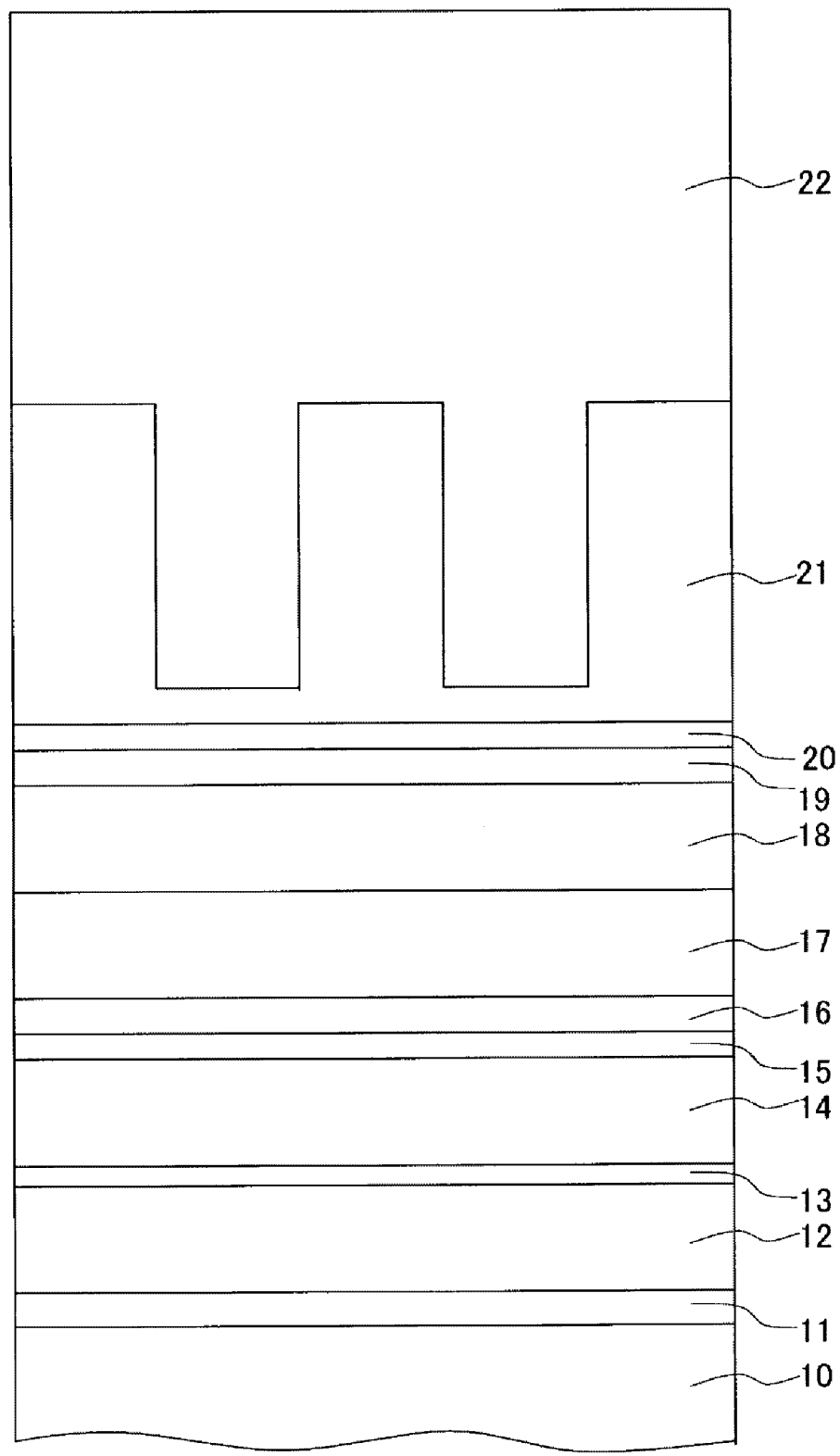
FIG. 26 is a drawing showing a manufacturing step of a magnetic recording medium according to Example 6.
Figure 27:
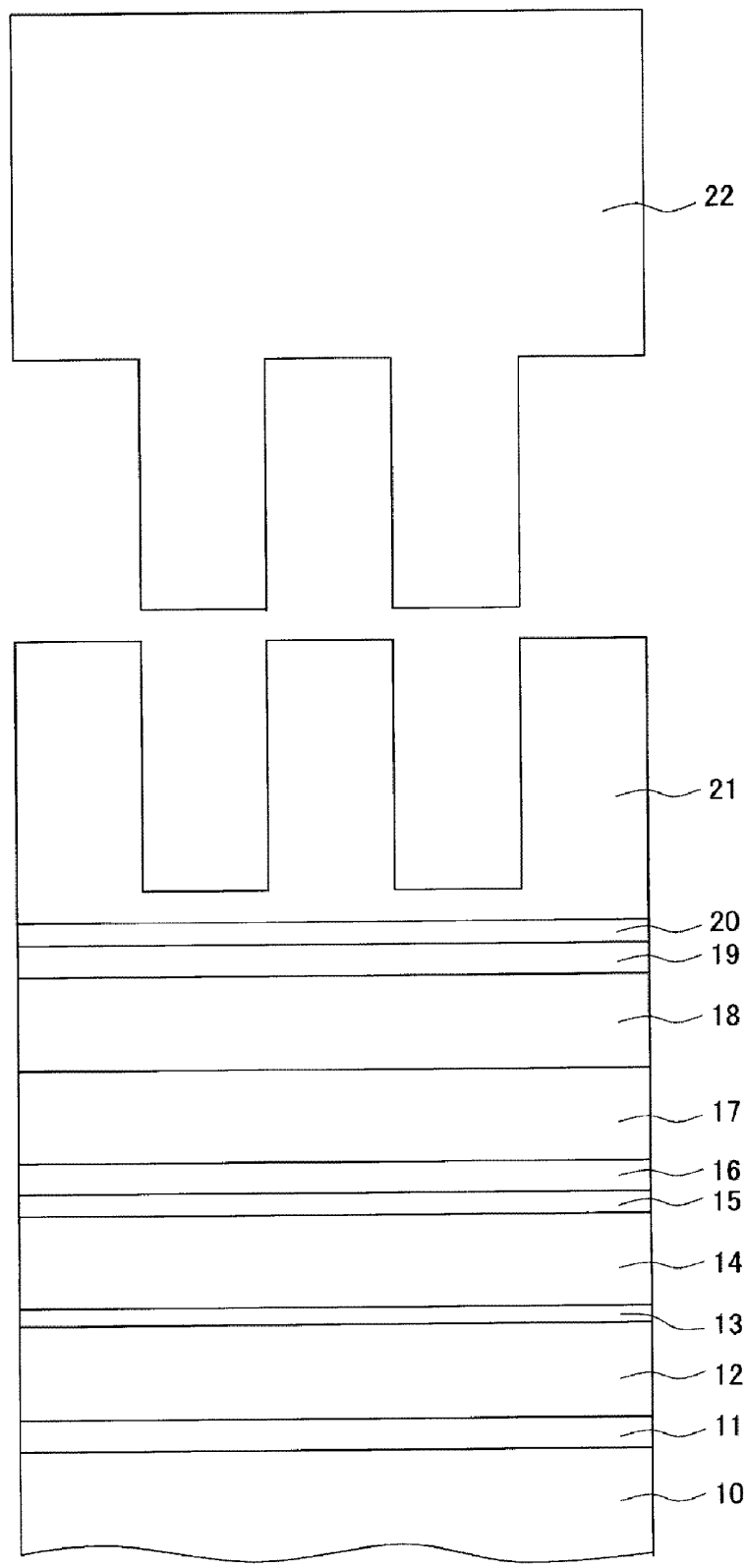
FIG. 27 is a drawing showing a manufacturing step of a magnetic recording medium according to Example 6.
Figure 28:
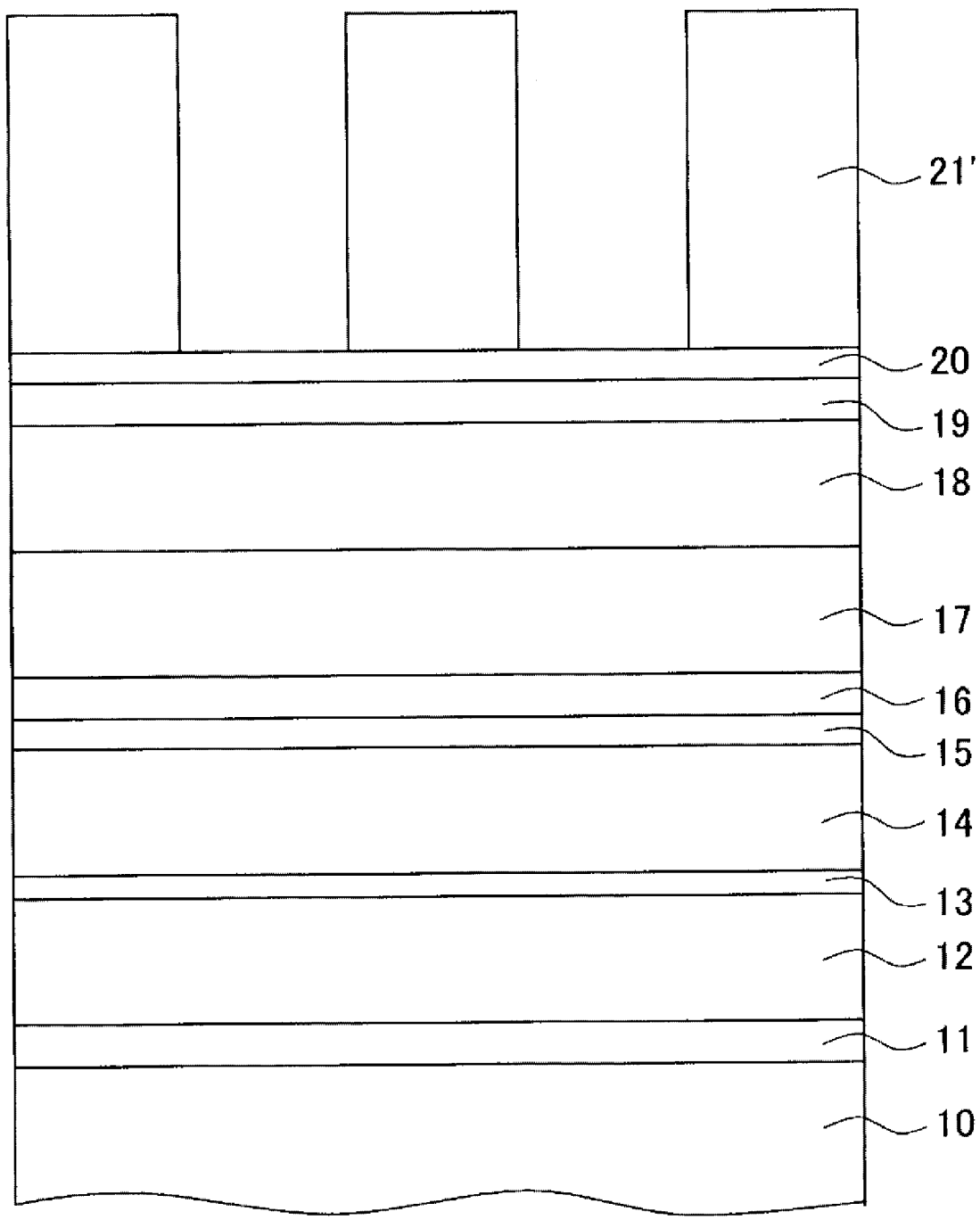
FIG. 28 is a drawing showing a manufacturing step of a magnetic recording medium according to Example 6.
Figure 29:
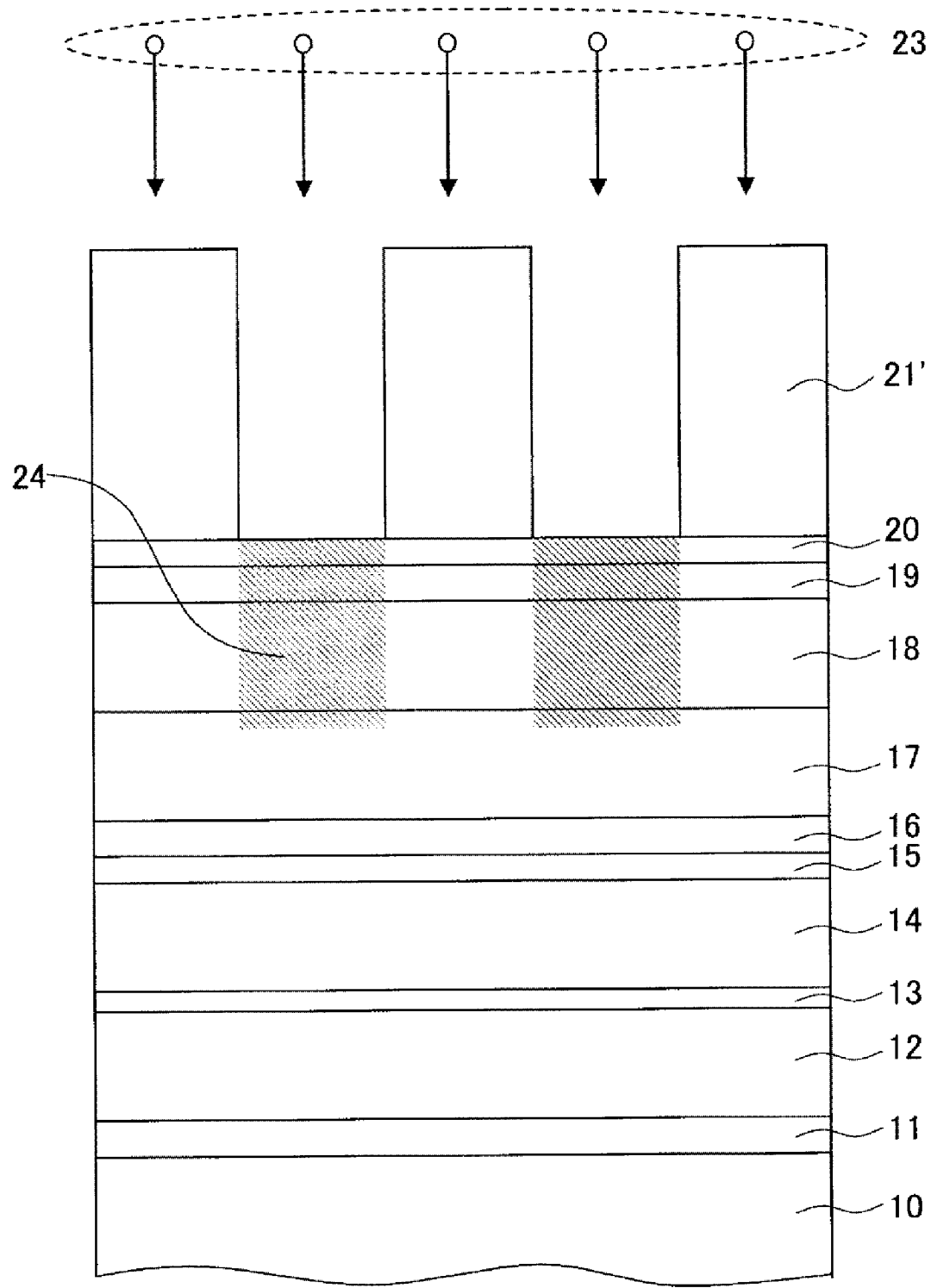
FIG. 29 is a drawing showing a manufacturing step of a magnetic recording medium according to Example 6.
Figure 30:
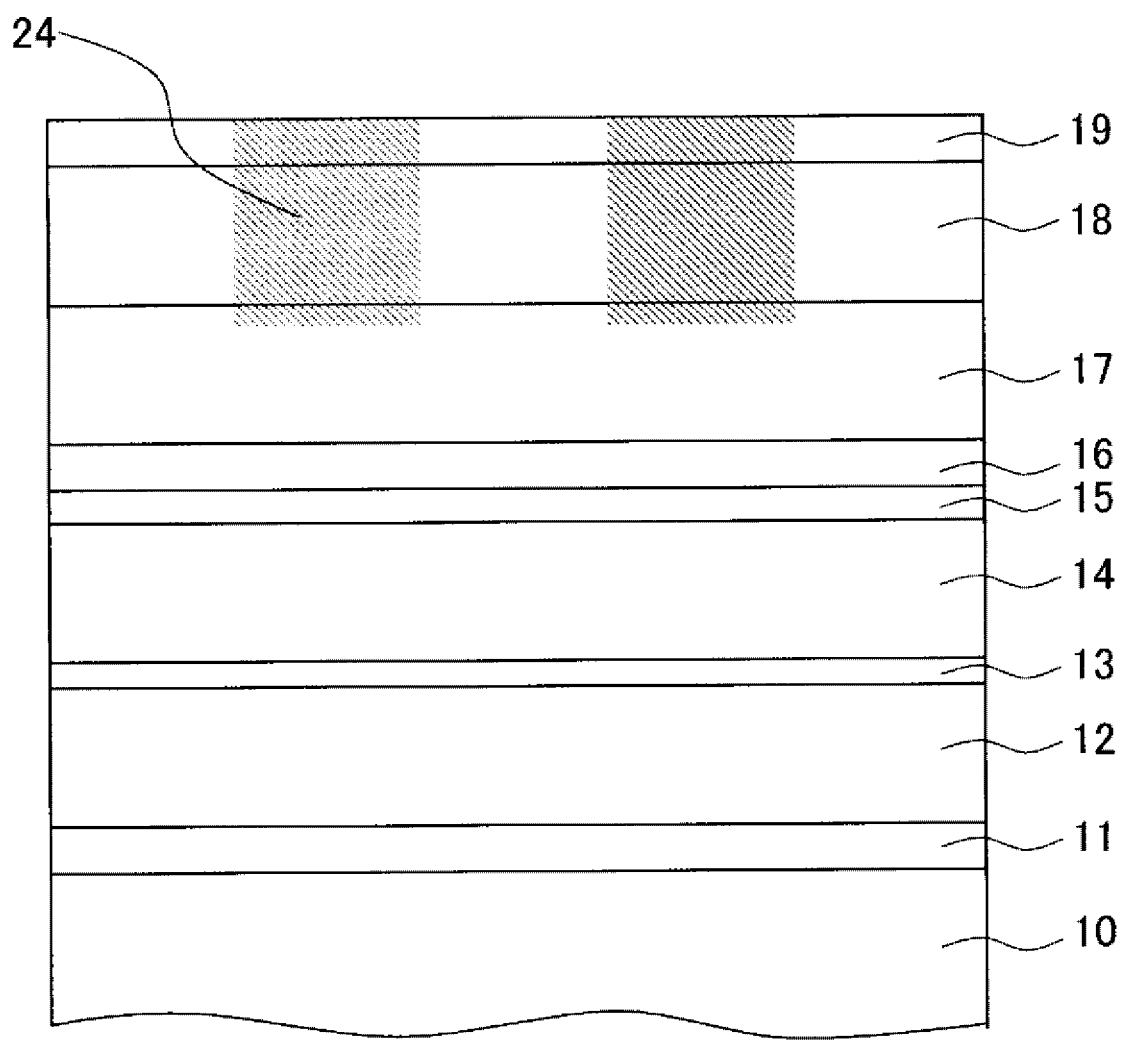
FIG. 30 is a drawing showing a manufacturing step of a magnetic recording medium according to Example 6.
Figure 31:
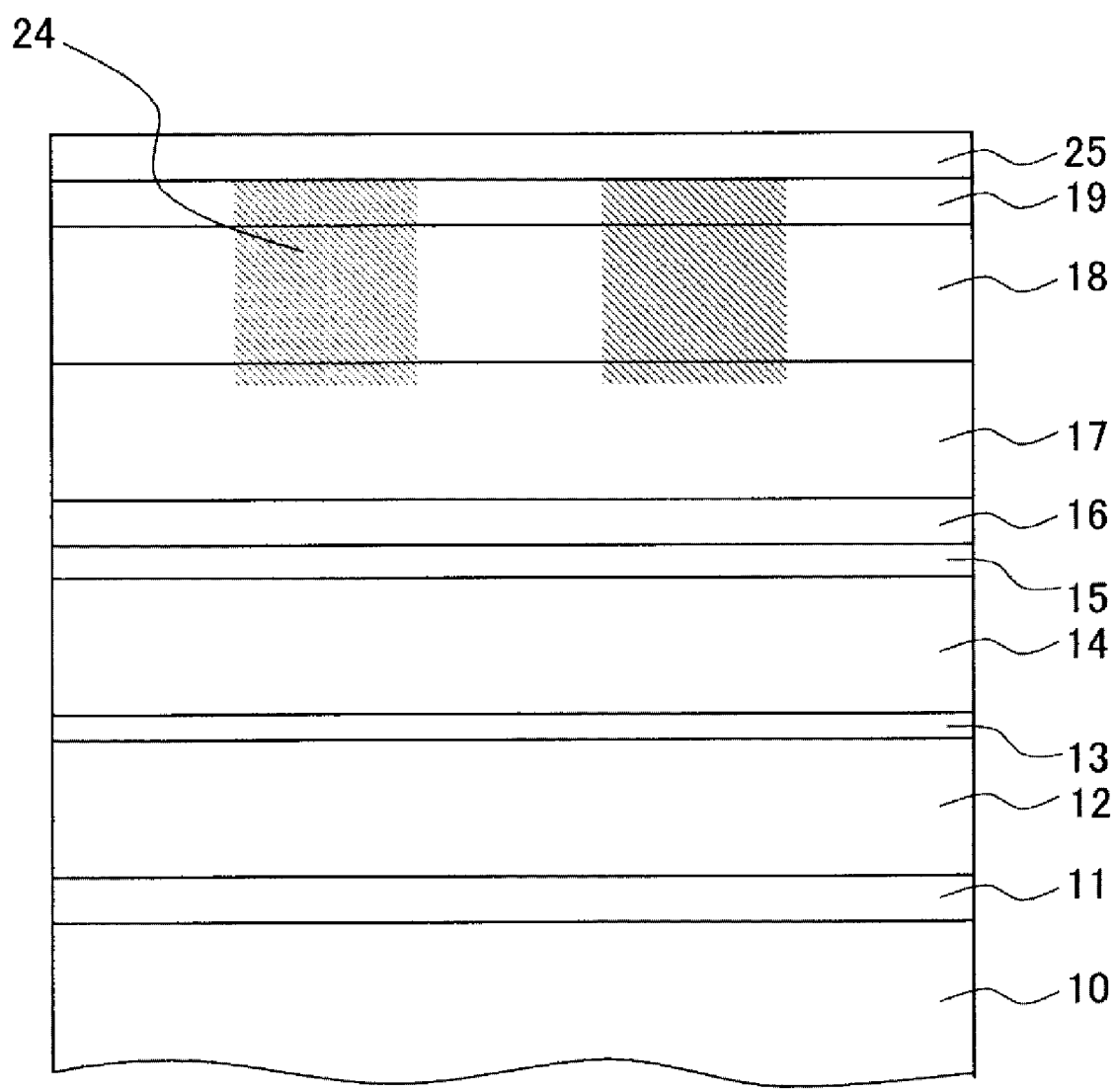
FIG. 31 is a drawing showing a manufacturing step of a magnetic recording medium according to Example 6.

After forming the second magnetic layer 19 in the same manner as the Example 1, a C layer in the thickness of 2 nm was formed as a nonmagnetic layer 20 (FIG. 24). A resist 21 was applied thereto and patterns were copied onto the resist 21 by pressing a stamper 22 with dot patterns formed thereon against the resist 21 (FIG. 25 to 27). The residual resist film on the grooves of the pattern was removed by oxygen ashing to form a resist pattern 21' having the dot pitch of 80 nm, the dot width of 40 nm, and the height of 120 nm (FIG. 28). Then, C ions as nonmagnetic element ions 23 were radiated to the medium to form more concentrated parts 24 of the nonmagnetic element (C in the present example) on some parts of the first magnetic layer 18 and the second magnetic layer 19 (FIG. 29). The acceleration voltage at the C ion radiation was 28 kV and the radiation amount was $1\times10^{15}$ to $4\times10^{16}/cm^2$. After that, the resist pattern 21' and the nonmagnetic layer 20 were removed by RIE using oxygen and a DLC protection film 25 in the thickness of 4 nm was formed in the same manner as the Example 1 (FIGS. 30 and 31).

As to bit patterned media, since there existed no system to be able to conduct the RW evaluation, the C concentrations in the track separators 24 and in the recording tracks were analyzed on media with ion radiation amount of $1\times10^{16}/cm^2$ in the same manner as the element analysis conducted in the Example 1. A lubrication film was not formed because the RW evaluation was not made in the present example.

Figure 43:
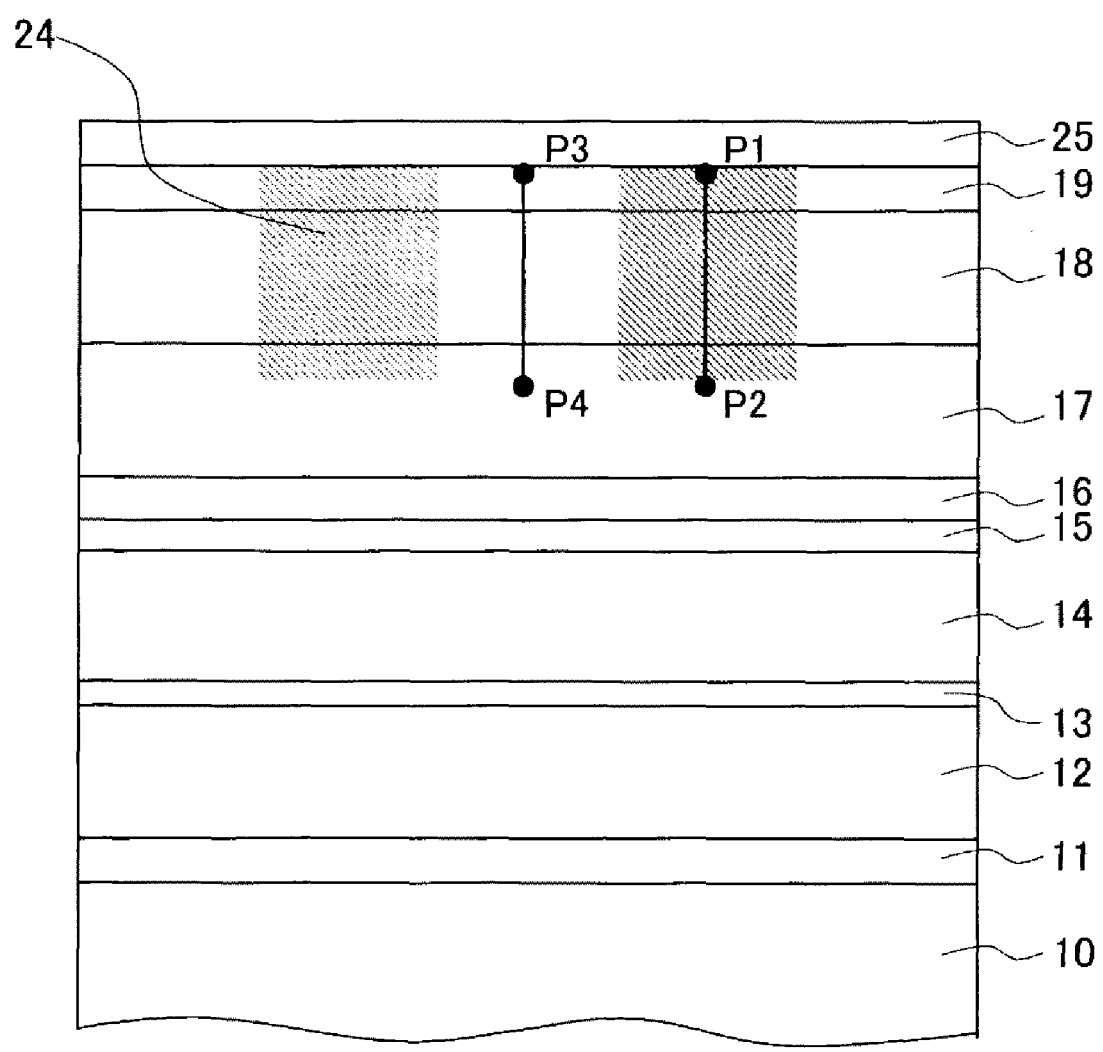
FIG. 43 is a schematic showing analysis positions where element analysis of a medium was conducted.

In the track separators 24, the analysis of the track separators was conducted from the vicinity of the top of the second magnetic layer 19 (P1 in FIG. 43) to the vicinity of the top of the second orientation control layer 17 (P2 in FIG. 43) in the direction perpendicular to the plane. In the recording tracks, the analysis was conducted from the vicinity of the top of the second magnetic layer 19 (P3 in FIG. 43) to the vicinity of the top of the second orientation control layer 17 (P4 in FIG. 43) in the direction perpendicular to the plane. An energy dispersive X-ray spectrometer (EDX) was used in the analysis.

Figure 44:
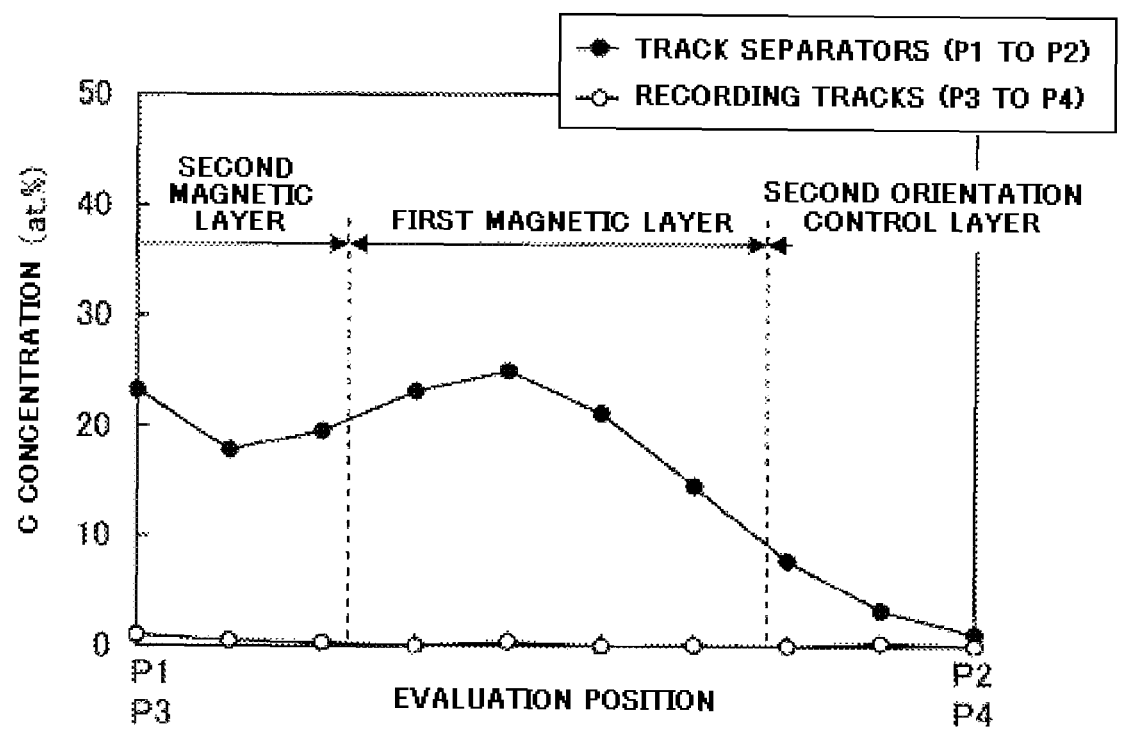
FIG. 44 is a schematic showing element analysis of a medium.

The results are shown in FIG. 44. As to the track separators 24, the C concentration was over 15 at. % at any position in the first magnetic layer 18 and the second magnetic layer 19. Since the Cr concentration in the magnetic layers is around 15 at. %, and B and $SiO_2$ are also contained about 8 at. % (or mol. %), it was recognized that the nonmagnetic material was contained about 40 at. % at any position in the magnetic layers. Since the magnetization is almost lost in magnetic layers in this level of the concentration of nonmagnetic material, it may be said that the track separators 24 satisfactorily separated the recording tracks. C was not especially detected from the recording tracks and the detected value could be regarded as measurement noise.

As set forth above, a bit patterned media was successfully produced by the method in the present example.

What is claimed is:

1. A magnetic recording medium comprising:
    a magnetic recording layer formed on a substrate and having at least two ferromagnetic alloy layers;
    portions of the ferromagnetic alloy layers contain a nonmagnetic element arranged in an in-plane direction across the magnetic recording layer to define tracks without the nonmagnetic element and track separators with the nonmagnetic element, and the tracks and the track separators are co-planar with each other; and
    the nonmagnetic element extends completely through the magnetic recording layer and partially into a layer beneath the magnetic recording layer.

2. New A magnetic recording medium according to claim 1, further comprising a nonmagnetic layer on the magnetic recording layer, and the nonmagnetic element extends through the nonmagnetic layer as well.

3. A magnetic recording medium according to claim 2, wherein the nonmagnetic layer is on top of the magnetic recording layer.

4. A magnetic recording medium according to claim 2, wherein the nonmagnetic layer is between the ferromagnetic alloy layers.

5. A magnetic recording medium according to claim 2, wherein the nonmagnetic layer has a thickness of 2 nm or less.

6. A magnetic recording medium according to claim 2, wherein the nonmagnetic element and the nonmagnetic layer are different materials.

7. A magnetic recording medium according to claim 1, wherein the portions of the ferromagnetic alloy layers are formed substantially concentrically.

8. A magnetic recording medium according to claim 1, wherein the nonmagnetic element is selected from the group consisting of Cr, Mo, W, V, Nb, Ta, Ti, Zr, Hf, Ru, B, C, Si, and Ge.

9. A magnetic recording medium according to claim 1, wherein the layer beneath the magnetic recording layer is a second orientation control layer.

10. A magnetic recording medium comprising:
    a substrate;
    an adhesion layer;
    a first soft-magnetic layer;

an antiferromagnetic coupling layer;
a second soft magnetic layer;
an under layer;
a first orientation control layer;
a second orientation control layer;
a magnetic recording layer having at least two ferromagnetic alloy layers;
portions of the ferromagnetic alloy layers contain a nonmagnetic element arranged in an in-plane direction across the magnetic recording layer to define tracks without the nonmagnetic element and track separators with the nonmagnetic element, and the tracks and the track separators are co-planar with each other; and
the nonmagnetic element extends completely through the magnetic recording layer and partially into a layer beneath the magnetic recording layer.

11. A magnetic recording medium according to claim 10, further comprising a nonmagnetic layer on the magnetic recording layer, and the nonmagnetic element extends through the nonmagnetic layer as well.

12. A magnetic recording medium according to claim 11, wherein the nonmagnetic layer is on top of the magnetic recording layer.

13. A magnetic recording medium according to claim 11, wherein the nonmagnetic layer is between the ferromagnetic alloy layers.

14. A magnetic recording medium according to claim 11, wherein the nonmagnetic layer has a thickness of 2 mn or less.

15. A magnetic recording medium according to claim 11, wherein the nonmagnetic element and the nonmagnetic layer are different materials.

16. A magnetic recording medium according to claim 10, wherein the portions of the ferromagnetic alloy layers are formed substantially concentrically.

17. A magnetic recording medium according to claim 10, wherein the nonmagnetic element is selected from the group consisting of Cr, Mo, W, V, Nb, Ta, Ti, Zr, Hf, Ru, B, C, Si, and Ge.

18. A magnetic recording medium according to claim 10, wherein the layer beneath the magnetic recording layer is the second orientation control layer.

19. A magnetic recording medium according to claim 10, wherein the layers are stacked on each other in the order in which they are listed.

* * * * *